US012791145B2

(12) United States Patent
Hudgins et al.

(10) Patent No.: US 12,791,145 B2
(45) Date of Patent: Nov. 10, 2026

(54) ATTACHABLE DISPLAY DEVICE

(71) Applicant: Stand Steady Company, LLC, Birmingham, AL (US)

(72) Inventors: Edward Tyler Hudgins, Arlington, VA (US); Scott Alexander Freeman, Waldorf, MD (US); Katie Kearns, Alexandria, VA (US); Edwin Martin Gaddis, Jr., Alexandria, VA (US)

(73) Assignee: Stand Steady Company, LLC, Birmingham, AL (US)

( * ) Notice: Subject to any disclaimer, the term of this patent is extended or adjusted under 35 U.S.C. 154(b) by 132 days.

(21) Appl. No.: 18/591,549

(22) Filed: Feb. 29, 2024

(65) Prior Publication Data

US 2024/0301992 A1 Sep. 12, 2024

Related U.S. Application Data

(60) Provisional application No. 63/450,207, filed on Mar. 6, 2023.

(51) Int. Cl.

*G06F 1/16* (2006.01)
*F16M 13/02* (2006.01)
*H01R 31/06* (2006.01)
*H01R 35/00* (2006.01)

(52) U.S. Cl.

CPC ........... *F16M 13/02* (2013.01); *G06F 1/1654* (2013.01); *H01R 31/065* (2013.01); *H01R 35/00* (2013.01); *H01R 2201/06* (2013.01)

(58) Field of Classification Search

CPC ...... F16M 13/02; F16M 11/043; F16M 11/08; G06F 1/1654; G06F 1/1626; G06F 1/1632; H01R 31/065; H01R 35/00; H01R 2201/06; H01R 35/04; G09F 9/00; G09F 9/35; G02F 1/1333

See application file for complete search history.

(56) References Cited

U.S. PATENT DOCUMENTS

| | | | | |
|---|---|---|---|---|
| 7,283,353 | B1 * | 10/2007 | Jordan | H04N 5/64 345/1.3 |
| 9,441,782 | B2 * | 9/2016 | Funk | F16M 13/00 |
| 10,066,784 | B2 * | 9/2018 | Wessels | F16M 11/10 |
| 10,082,832 | B1 * | 9/2018 | Wang | G06F 1/1681 |
| 11,320,856 | B2 * | 5/2022 | Magargee | G06F 1/1611 |
| 11,416,024 | B2 * | 8/2022 | Bryant | G06F 1/1632 |
| 11,455,013 | B2 * | 9/2022 | Chan | H01R 13/6205 |
| 11,619,971 | B1 * | 4/2023 | Passe | H04M 1/72409 361/679.41 |
| 11,815,953 | B2 * | 11/2023 | Yao | G06F 1/1649 |
| 12,228,238 | B2 * | 2/2025 | Ferraris | F16M 11/041 |
| 12,259,749 | B2 * | 3/2025 | Ye | G06F 1/1607 |
| 12,487,636 | B2 * | 12/2025 | Carnevali | G06F 1/1632 |

(Continued)

*Primary Examiner* — Rockshana D Chowdhury

(74) *Attorney, Agent, or Firm* — Bradley Arant Boult Cummings LLP; Stephen H. Hall; Jessica L. Zurlo

(57) ABSTRACT

An external display screen for use on electronic devices is disclosed. The display screen may be removably mounted onto a surface of an electronic device to provide the user with an additional display screen. The external display screen is lightweight and has a more even weight distribution than other attachable display accessories due to the placement of the mother control board in the mount. The external display screen also provides for a wireless connection to the electronic device.

14 Claims, 18 Drawing Sheets

(56) References Cited

U.S. PATENT DOCUMENTS

| | | | | |
|---|---|---|---|---|
| 2003/0043087 | A1* | 3/2003 | Kim | G06F 1/1641<br>345/1.1 |
| 2009/0090825 | A1* | 4/2009 | Jung | G06F 1/1601<br>16/221 |
| 2011/0298690 | A1* | 12/2011 | Reilly | G06F 1/1649<br>345/1.1 |
| 2013/0092805 | A1* | 4/2013 | Funk | F16M 13/00<br>248/274.1 |
| 2013/0335914 | A1* | 12/2013 | Lee | G06F 1/1654<br>361/679.41 |
| 2016/0246332 | A1* | 8/2016 | Deng | G06F 1/1662 |
| 2018/0046225 | A1* | 2/2018 | Amarilio | G06F 1/1616 |
| 2021/0132657 | A1* | 5/2021 | Chan | H01R 13/6205 |
| 2021/0405702 | A1* | 12/2021 | Hudgins | G06F 1/1622 |
| 2023/0332732 | A1* | 10/2023 | Fan | F16M 11/041 |

* cited by examiner

ATTACHABLE DISPLAY DEVICE

CROSS REFERENCE TO RELATED APPLICATIONS

This application claims the benefit of and priority to U.S. Provisional Application No. 63/450,207, filed on Mar. 6, 2023, and entitled "Attachable Display Device," the disclosure of which is expressly incorporated by reference in its entirety.

FIELD OF THE DISCLOSURE

The present disclosure relates generally to attachable display accessories for portable electronic devices. More particularly, the disclosure relates to rotatable and adjustable display screens that attach to an electronic device.

BACKGROUND

Conventional portable electronic devices, such as laptop computers, are generally provided with a single display screen. Users need to switch among windows on the screen when viewing different graphics or processing different files of data at the same time. This causes inconvenience to the user and does not satisfy user requirements. While attachable display accessories, such as attachable display screens, have been developed, these accessories are bulky, heavy, and are not easily transportable. Indeed, many of the attachable display accessories also have uneven weight distributions due to the placement of the display control electronics in the display screen housing. Because the display screen is heavier than its mount (and often unsupported), the attachable display accessory is more likely to detach from or change the balance of the portable electronic device when in the extended position. Moreover, the attachable display screens currently on the market generally require the use of multiple cords to provide wired connections between the accessory and the portable electronic device to which it is attached.

Accordingly, there remains a need in the art for an attachable display screen that is sturdy, compact, easily transportable, and has a reduced number of wired connections needed for attachment to the portable electronic device.

SUMMARY

The problems expounded above, as well as others, are addressed by the following inventions, although it is to be understood that not every embodiment of the inventions described herein will address each of the problems described above.

In some embodiments, an attachable display device is provided, the attachable display device including a mount configured to be removably attached to a portable electronic device, a hinge operatively attached to the mount, a display screen attached to the mount via the hinge, wherein the display screen is operable to selectively transition between a closed position in which the display screen is positioned behind the mount and an open position in which the display screen extends outwardly of the mount to be exposed from one side of the mounting frame, and wherein the mount includes a control board disposed therein, the control board including an electrical connector configured to supply power to and communicate with the display screen, wherein the electrical connector operatively connects the control board to the display screen. In one embodiment, the mount includes a first portion of a pogo pin connector coupled thereto. In another embodiment, the portable electronic device includes a second portion of the pogo pin connector coupled thereto configured to receive the first portion of the pogo pin connector, wherein the control board is configured to receive signals sent from the portable electronic device and the signals are communicated from the portable electronic device to the control board via the pogo pin connector in response to engagement of the first portion with the second portion. In still another embodiment, the mount includes a recess having a magnet embedded therein and the recess is configured for receiving an attachment mechanism on the portable electronic device. In yet another embodiment, the electrical connector includes a first end operatively connected to the control board and a second end operatively connected to an electrical panel disposed in the display screen. In another embodiment, the electrical connector is fed through the interior of the hinge.

In further embodiments, an attachable display device is provided, the attachable display device including a mount configured to be removably attached to a rear of a portable electronic device, a torque hinge operatively attached to the mount, the torque hinge including a cover having an interior portion, a display screen attached to the mount via the pivot point of the torque hinge, wherein the display screen is operable to selectively transition between a closed position in which the display screen is positioned behind the mount and an open position in which the display screen extends outwardly of the mount to be exposed from one side of the mounting frame, and the display screen is configured to vertically rotate relative to the mount to allow the display screen to be placed in a tilted configuration, and wherein the mount includes a control board disposed therein, the control board including an electrical connector configured to supply power to and communicate with the display screen, wherein the electrical connector operatively connects the control board to the display screen and is fed through the interior portion of the cover.

In one embodiment, the display screen is configured to vertically rotate 360 degrees about the pivot point. In another embodiment, the mount includes a first portion of a pogo pin connector coupled thereto. In still another embodiment, the portable electronic device includes a second portion of the pogo pin connector coupled thereto configured to receive the first portion of the pogo pin connector, wherein the control board is configured to receive signals sent from the portable electronic device and the signals are communicated from the portable electronic device to the control board via the pogo pin connector in response to engagement of the first portion with the second portion. In yet another embodiment, the electrical connector includes a first end operatively connected to the control board and a second end operatively connected to an electrical panel disposed in the display screen. In still another embodiment, the electrical connector is fed through a space under the torque hinge and above a bottom portion of the cover. In another embodiment, the mount includes a recess having a magnet embedded therein and the recess is configured for receiving an attachment mechanism on the portable electronic device.

In still further embodiments, an attachable display device is provided, the attachable display device including a mount configured to be removably attached to a rear of a portable electronic device, wherein the mount includes a first portion of a pogo pin connector coupled thereto and a control board disposed therein, the control board configured to receive signals sent from the portable electronic device, a torque hinge operatively attached to the mount, the torque hinge including a pivot point, a display screen attached to the mount via the pivot point of the torque hinge, wherein the display screen is operable to selectively transition between a closed position in which the display screen is positioned behind the mount and an open position in which the display screen extends outwardly of the mount to be exposed from one side of the mounting frame, and the display screen is configured to vertically rotate relative to the mount to allow the display screen to be placed in a tilted configuration, and wherein the portable electronic device comprises a second portion of the pogo pin connector coupled thereto configured to receive the first portion of the pogo pin connector, wherein the signals are communicated from the portable electronic device to the control board via the pogo pin connector in response to engagement of the first portion with the second portion.

In one embodiment, the mount includes a recess having a magnet embedded therein and the recess is configured for receiving an attachment mechanism on the portable electronic device. In another embodiment, the attachment mechanism on the portable electronic device is configured to magnetically couple to the recess. In still another embodiment, the signals sent from the portable electronic device are high-speed signals. In yet another embodiment, the portable electronic device is a laptop. In another embodiment, the attachable display device further includes a kickstand rotatably attached to the mount. In still another embodiment, the kickstand is integrally formed with the mount.

BRIEF DESCRIPTION OF THE DRAWINGS

Further features and advantages can be ascertained from the following detailed description that is provided in connection with the drawings described below.

DETAILED DESCRIPTION

Figure 1:
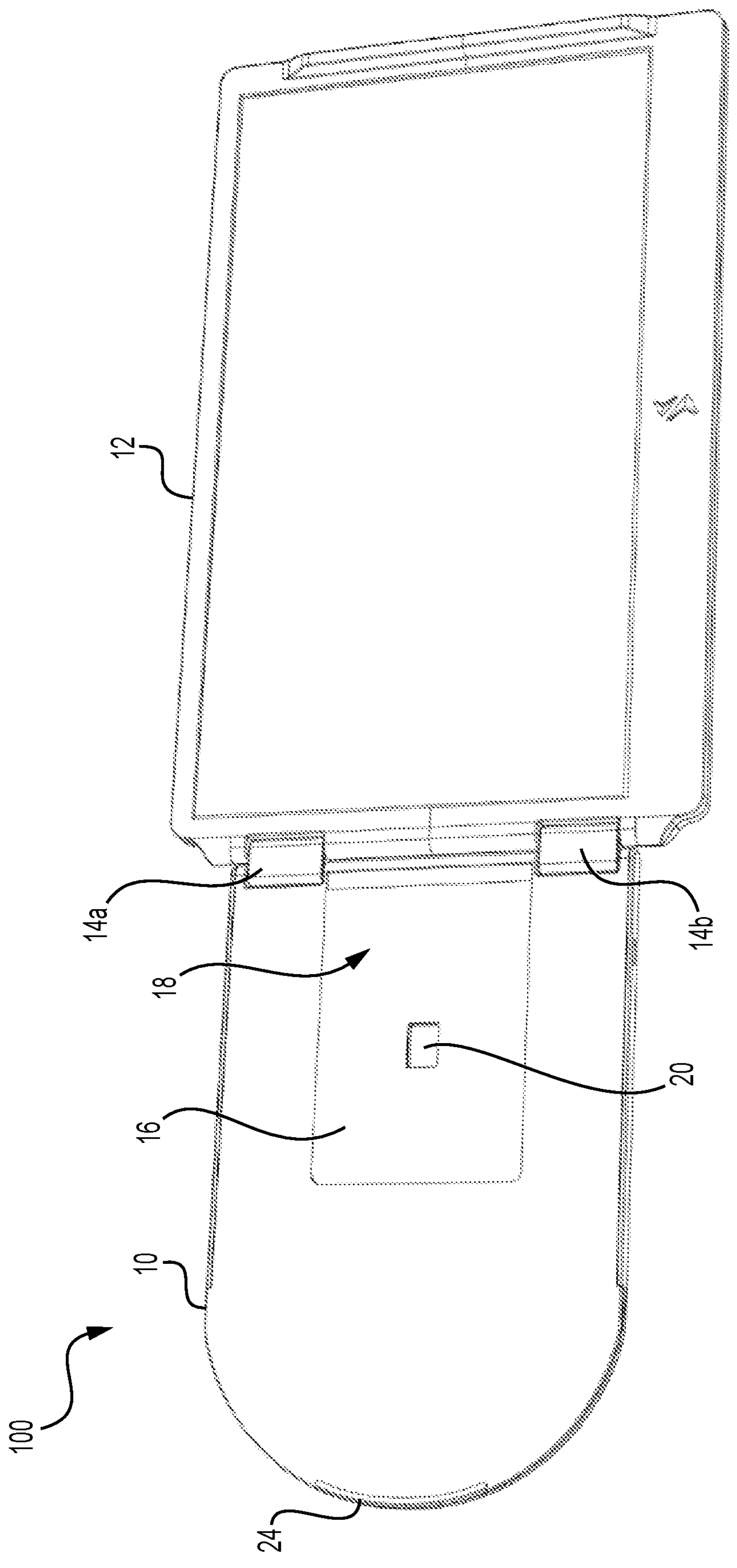
FIG. 1 is a front perspective view of an attachable display device according to one embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

The term "substantially" allows for deviations from the descriptor that do not negatively impact the intended purpose. Descriptive terms are understood to be modified by the term "substantially" even if the word "substantially" is not explicitly recited.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The present disclosure provides an attachable external display monitor for use on electronic devices. More specifically, the display monitor may be removably mounted onto an electronic device to provide the user with an additional display screen. The attachable display monitor may be mounted onto any electronic device including, but not limited to, a laptop, tablet, tablet computer, desktop computer, smart phone, television, and gaming system. In one embodiment, the attachable display monitor may be mounted onto a laptop or tablet. For example, the attachable display monitor can be mounted onto a Chromebook laptop or tablet. The attachable display monitor is lightweight and has a more even weight distribution than other attachable display accessories. The attachable display monitor of the present disclosure also provides for a wireless connection to the electronic device and provides users increased functionality and usability while still retaining the portability of the electronic device.

Referring to FIGS. 1-9, an attachable display screen 100 according to one embodiment of the present disclosure is shown. As illustrated in FIG. 1, the attachable display screen 100 includes a mount 10 operatively attached to a display screen 12. The mount 10 is configured for removable attachment to a surface of a portable electronic device (not shown), such as to a rear surface of a laptop. The mount 10 is operatively attached to the display screen 12 by two hinges—an upper hinge 14*a* and a lower hinge 14*b*. The upper and lower hinges 14*a*, 14*b* allow the display screen 12 to rotate about the mount 10 to varying positions. The upper and lower hinges 14*a*, 14*b* are designed to provide continual resistance throughout the entire range of motion in adjusting the display screen 12, making it possible to deploy the display screen 12 between a closed position in which the display screen 12 is positioned behind the mount 10 and an open position in which the display screen 12 is extended outwardly from the mount 10, as will be described in more detail below.

It is contemplated that the mount 10 and the display screen 12 be ergonomically sized so as to minimize the weight of the attachable display screen 100 and reduce stress placed on the user's electronic device. In one embodiment, the total thickness of the attachable display screen 100 (including the mount 10 and the display screen 12) is about 5 mm to about 20 mm. In another embodiment, the total thickness of the attachable display screen 100 (including the mount 10 and the display screen 12) is about 8 mm to about 18 mm. In still another embodiment, the total thickness of the attachable display screen 100 (including the mount 10 and the display screen 12) is about 8 mm to about 15 mm. In another embodiment, the total thickness of the attachable display screen 100 (including the mount 10 and the display screen 12) is about 5 mm. In yet another embodiment, the total thickness of the attachable display screen 100 (including the mount 10 and the display screen 12) is about 8 mm. In still another embodiment, the total thickness of the attachable display screen 100 (including the mount 10 and the display screen 12) is about 15 mm.

Figure 2A:
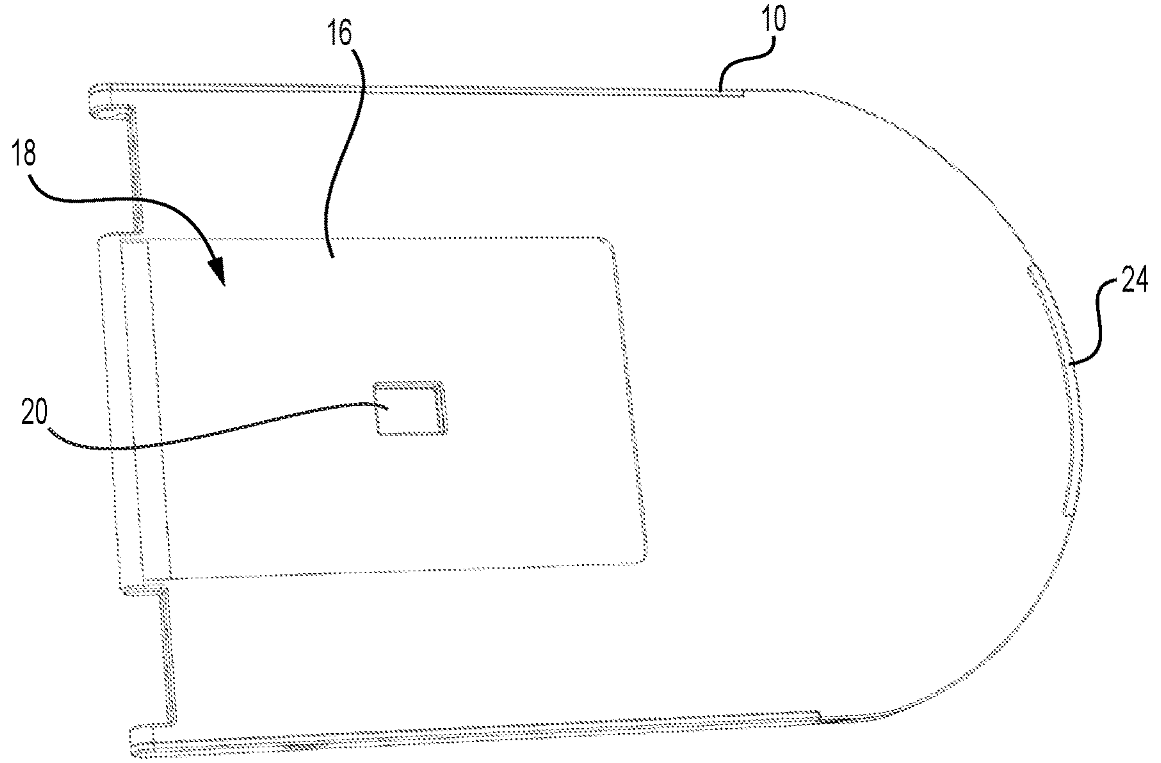
FIG. 2A is a front perspective view of a mount portion of the attachable display device shown in FIG. 1 according to one embodiment of the present disclosure.
Figure 2B:
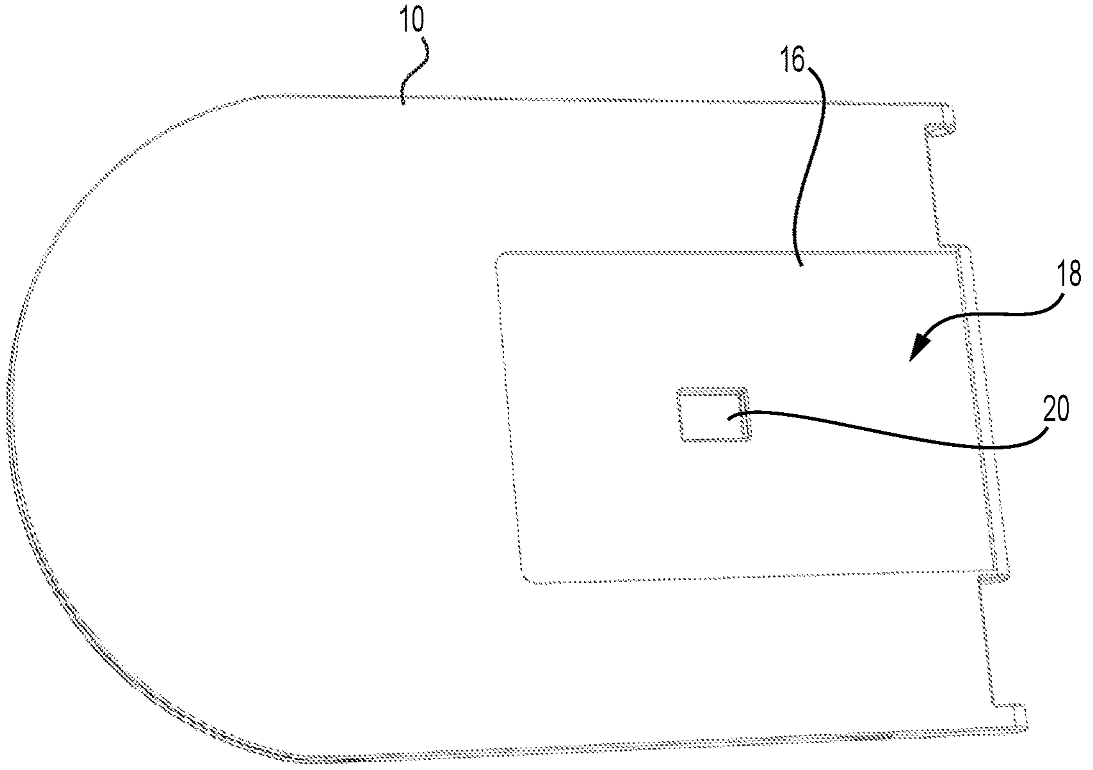
FIG. 2B is a rear perspective view of the mount shown in FIG. 2A.

FIGS. 2A and 2B show a front and rear view, respectively, of the mount 10. In the illustrated embodiment, the mount 10 is constructed as a single plate. The plate may be formed of plastic, glass, ceramics, fiber composites, metal such as stainless steel or aluminum, other suitable materials, or a combination of these materials. In one embodiment, the mount 10 is formed of aluminum. In other embodiments, the mounting frame 10 may be formed from multiple separate components, for example, a front plate and a back plate.

As shown in FIG. 2A, the front and back of the mount 10 each include a recess 16. The recess 16 is configured to receive an attachment mechanism located on the surface of the portable electronic device to which the attachable display screen 100 is to be mounted. In one embodiment, one or more magnets 72 (shown in FIG. 6A) are housed within the interior of the recess 16. In this embodiment, the attachment mechanism on the portable electronic device can be received within the recess 16 and securely attach to the mount 10 via a magnetic connection. In one embodiment, the magnets 72 may be embedded within the interior of the recess 16 such that they are not visible from the exterior of the mount 10. In some embodiments, as illustrated in FIGS. 2A and 2B, a cover 18 may be positioned over the magnets. Any number of magnets may be housed within the recess 16. In one embodiment, a single magnet may be housed within the recess 16. In another embodiment, more than one magnet may be housed within the recess 16. For example, the recess 16 may include two, three, four, five, six, seven, eight, nine, or ten magnets housed therein. In a preferred embodiment, the recess 16 includes five magnets housed therein to ensure a strong connection to the surface of the portable electronic device. In some embodiments, as will be described in more detail below, one or more closing magnets 74 (shown in FIG. 6A) may also be embedded within the mount 10 at an end opposite the recess 16. This helps ensure that the mount 10 remains attached to the display screen 12 when in the stored or closed position.

As shown in FIGS. 2A and 2B, both the front and the back of the mount 10 include the recess 16 so that both sides of the mount 10 can attach to the surface of the portable electronic device depending on the desired position of the display screen 12. For example, when the display screen 12 is in the open position, the attachment mechanism on the surface of the portable electronic device can be received within the recess 16 on the front of the mount 10. However, when the display screen 12 is closed, the mount 10 may be flipped such that the recess 16 on the back of the mount 10 is attached to the attachment mechanism on the surface of the portable electronic device so that the display screen 12 can be placed face down against the back of the portable electronic device.

In the illustrated embodiment, the shape of the mount 10 is that of a sideway U-shape and the shape of the recess 16 is that of a square. However, the shape of the mount 16 and the recess 16 may vary so long as the components allow for a secure attachment to the portable electronic device. Moreover, while the use of magnets has been described herein as an exemplary means for attaching the mount 10 to the portable electronic device, one of ordinary skill in the art will recognize that that the mount 10 may be secured to the electronic device by any suitable means including, but not limited to, by hooks, adhesives, screws, pins, projections, or snap catch elements.

In some embodiments, as illustrated in FIGS. 2A and 2B, the recess 16 may include a sighting hole 20. The sighting hole 20 is located in the center of the cover 18 such that any magnets embedded within the recess 16 are positioned around it. The sighting hole 20 can be used as an alignment aid to accurately position the recess 16 over the attachment mechanism located on the surface of the portable electronic device. For example, a user can align the sighting hole 20 with an indicator, such as a symbol, on the attachment mechanism so that the attachment mechanism can be properly aligned with and received within the recess 16 for a secure connection.

Figure 3:
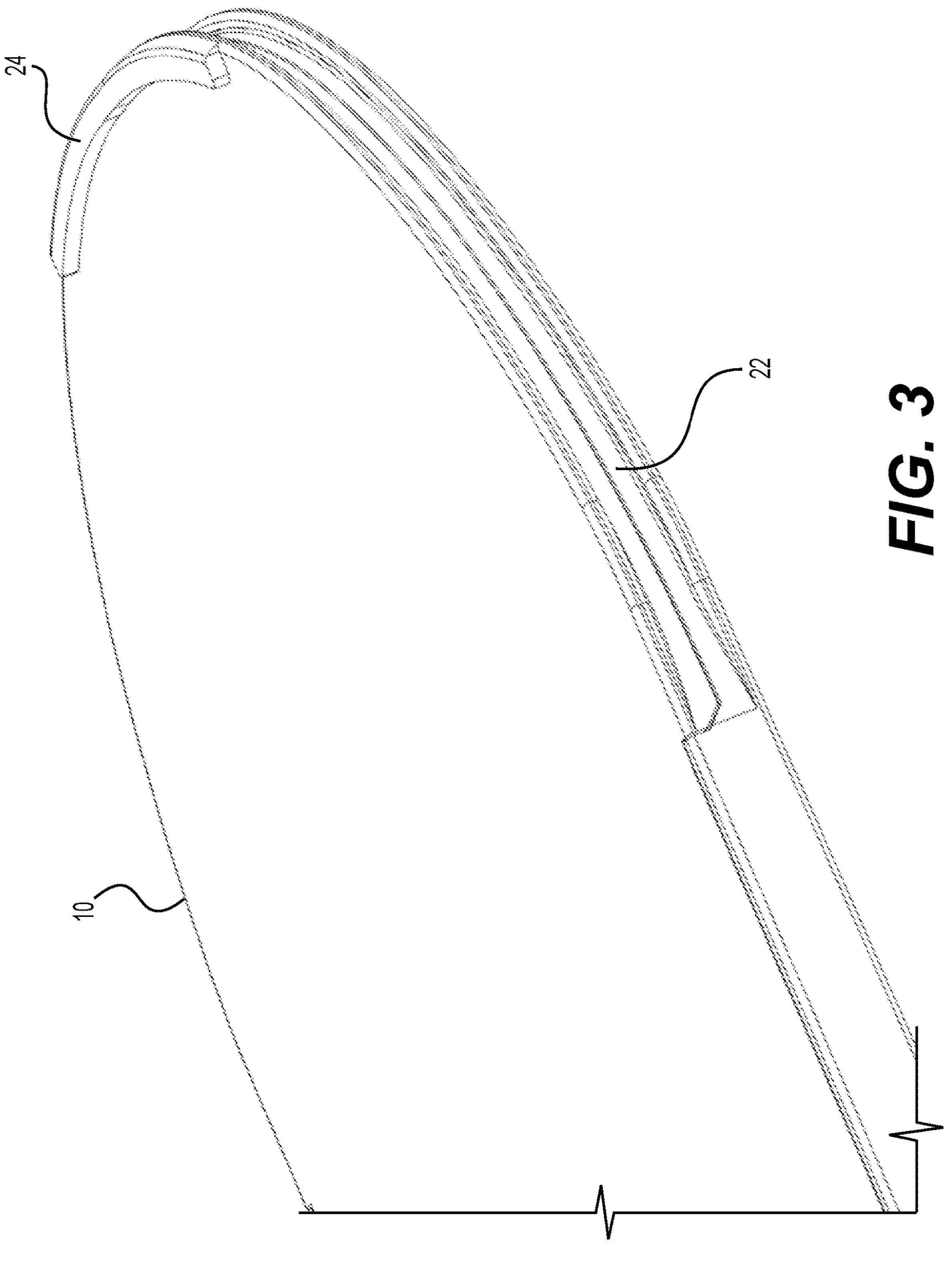
FIG. 3 is a partial view of the mount shown in FIG. 2A illustrating a groove and a lip.

In further embodiments, as shown in FIG. 3, the mount 10 may include a groove 22. The groove 22 extends along the outer perimeter of the end of the mount 10 opposite the hinges 14*a*, 14*b*. The groove 22 allows the user to grip and remove the mount 10 from the portable electronic device with ease. The mount 10 may also include a lip 24, as illustrated in FIG. 3. As will be described in more detail below, the lip 24 ensures that the mount 10 is pressed against the display screen 12 when closed and in the stored position.

In some embodiments, the mount 10 also houses a control board 70 (shown in FIG. 6A), such as a printed circuit board, that provides power to the attachable display screen 100 and communicates with both the display screen 12 and the portable electronic device to which the attachable display screen 100 is attached. The control board 70 may be any type of integrated circuit that is operable to transmit data to the display screen 12 and the portable electronic device. The present disclosure contemplates that the control board 70 be located on the interior of the mount 10 and adjacent to the recess 16. By housing the control board 70 in the mount 10 (rather than in the display screen), the display screen 12 can be lighter and thinner, which provides a better and more even weight distribution of the attachable display screen 100 when it is in use.

To establish communication between the control board 70 in the mount 10 and the display screen 12, an electrical connector, such as a cable (not shown), can operatively connect the control board 70 to the display screen 12. The electrical connector can be fed through the interior of the mount 10 and through either of the hinges 14*a*, 14*b* to connect the control board to electronics in the display screen 12.

Figure 4:
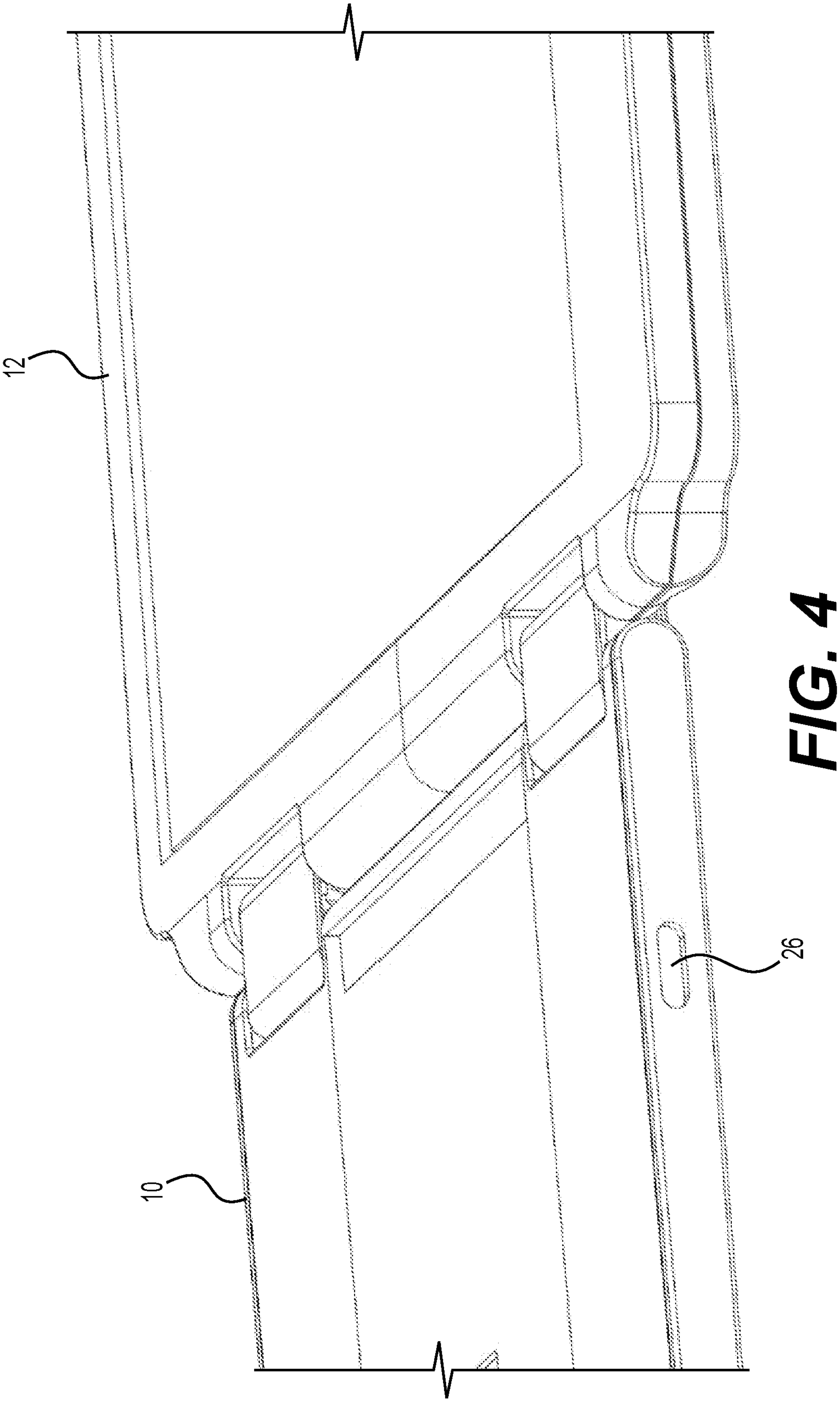
FIG. 4 is a partial view of the attachable display device shown in FIG. 1 illustrating a communications port on the mount.

In some embodiments, the mount 10 may also include an external communications port 26 to establish communication between the control board and the portable electronic device, as shown in FIG. 4. The external communications port 26 is operatively connected to the control board. As will be described in more detail below, the external communications port 26 is configured to receive a wired connection from the portable electronic device to establish communication.

Figure 4A:
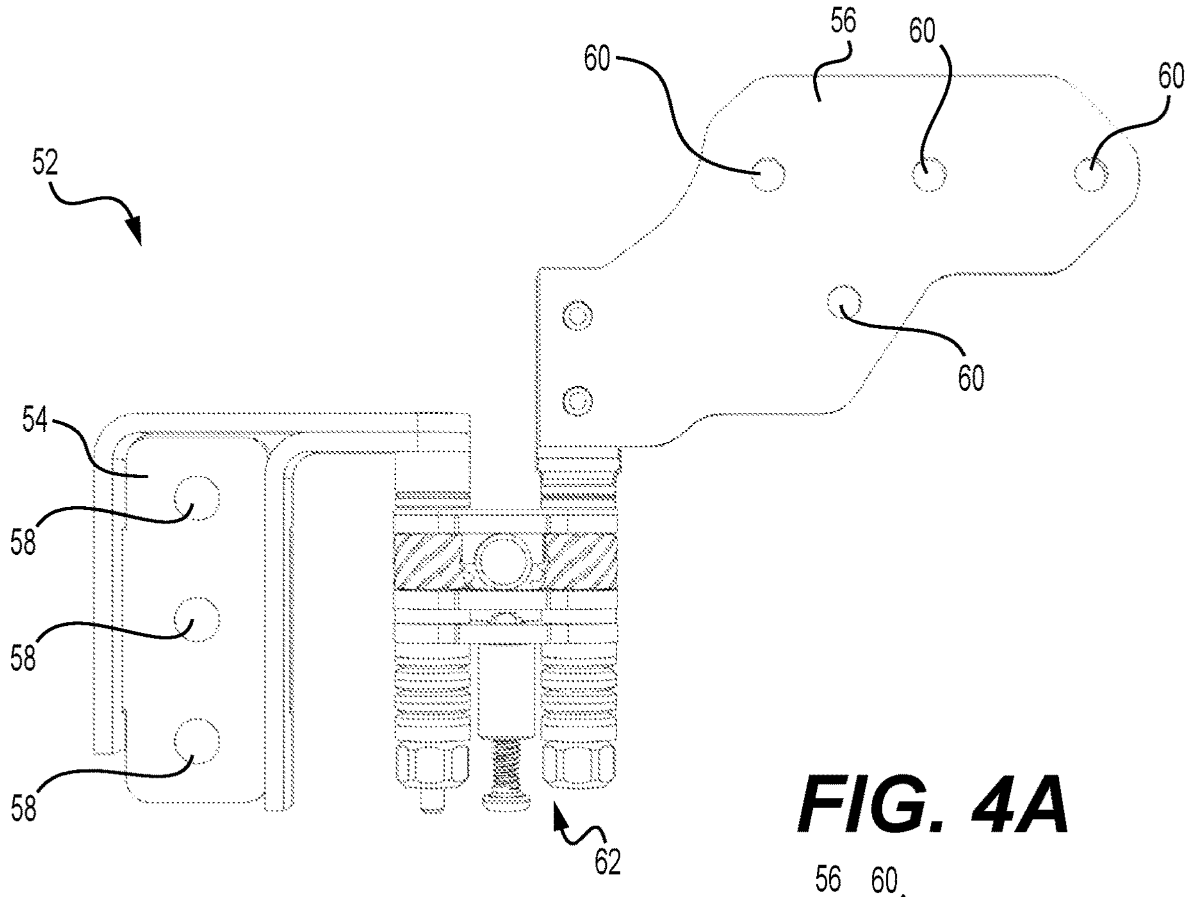
FIG. 4A is a front view of a torque hinge for use with the attachable display device according to one embodiment of the present disclosure.
Figure 4B:
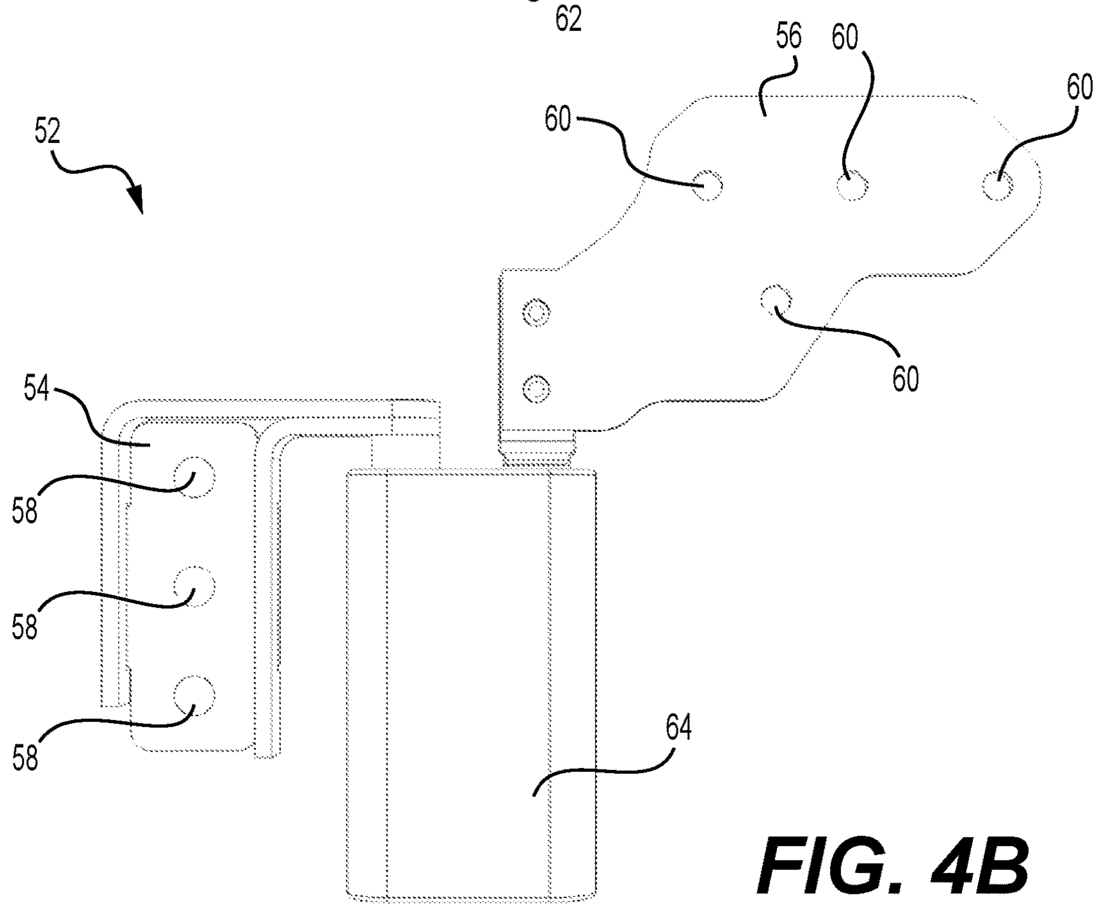
FIG. 4B is a front view of the torque hinge for use with the attachable display device according to another embodiment of the present disclosure.

FIGS. 4A and 4B show a torque hinge 52 that can be used for the hinges 14*a*, 14*b* according to one embodiment of the present disclosure. As shown in FIG. 4A, the torque hinge 52 includes a first connector 54 that is configured for attachment to an interior portion of the display screen 12 and a second connector 56 that is configured for attachment to an interior portion of the mount 10. The first connector 54 may include a plurality of apertures 58 through which fasteners may be inserted for attaching the first connector 54 to the display screen 12. The second connector 56 may include a plurality of apertures 60 through which fasteners may be inserted for attaching the second connector 56 to the mount 10. A hinge mechanism 62 may be operatively connected to the first connector 54 and the second connector 56, which allows the display screen 12 to rotate about the mount 10 to varying positions.

As shown in FIG. 4B, a cover 64 may be placed over the hinge mechanism 62. In this embodiment, the electrical connector can be fed through the interior of the mount 10 and through the cover 64 of the torque hinge 52 to connect the control board in the mount 10 to electronics in the display screen 12. In one embodiment, the cover 64 may include a cable passing portion which is a space in which the electrical connector can pass through the torque hinge 52. For example, the cable passing portion may be a space on the interior portion of the cover 64 that is located below the hinge mechanism 62 and above the bottom portion of the cover 64 so that the cable does not interfere with the rotation of the torque hinge 52. In this embodiment, the cable can loop under the lower portion of the hinge mechanism 62 without interfering with the rotation of the hinge.

Figure 5A:
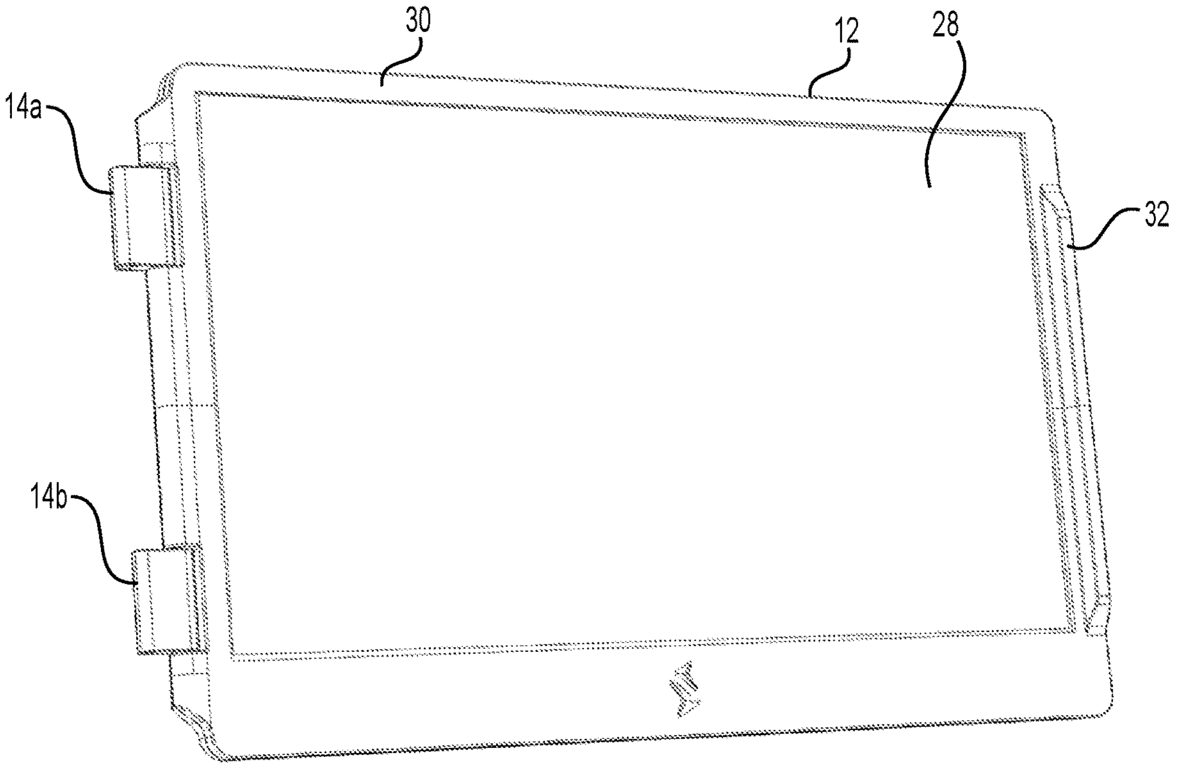
FIG. 5A is a front perspective view of the display screen of the attachable display device shown in FIG. 1 according to one embodiment of the present disclosure.
Figure 5B:
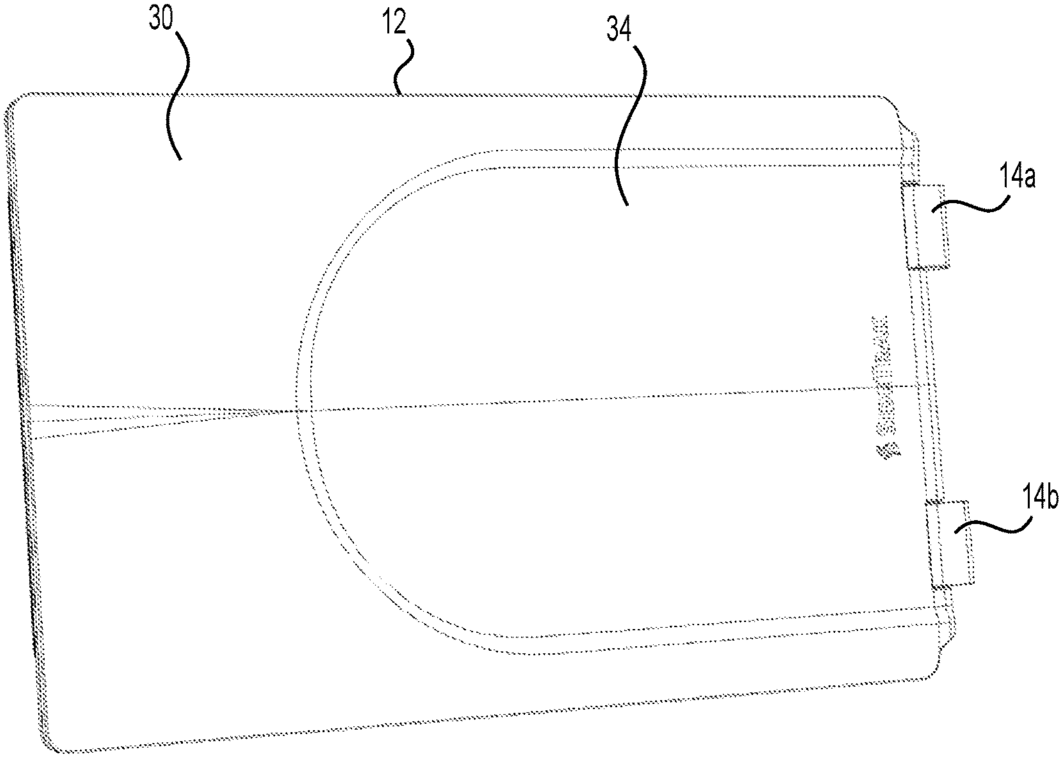
FIG. 5B is a rear perspective view of the display screen shown in FIG. 5A.

FIGS. 5A and 5B show a front and rear view, respectively, of the display screen 12. As shown in FIGS. 5A and 5B, the display screen 12 includes a screen portion 28 housed within an outer panel 30. The outer panel 30 includes the hinges 14*a*, 14*b* attached thereto for rotating the display screen 12 about the mount 10. The outer panel 30 may also include a bump out portion 32. The bump out portion 32 is configured to rest upon a back surface of the portable electronic device when the display screen 12 is closed and in the stored position to form a secure connection and prevent the display screen from unintentionally opening. In some embodiments, the bump out portion 32 may also house one or more controls or buttons for adjusting the settings of the screen portion 28. For example, the bump out portion 32 may include one or more buttons for adjusting the brightness of the screen portion 28.

Figure 9:
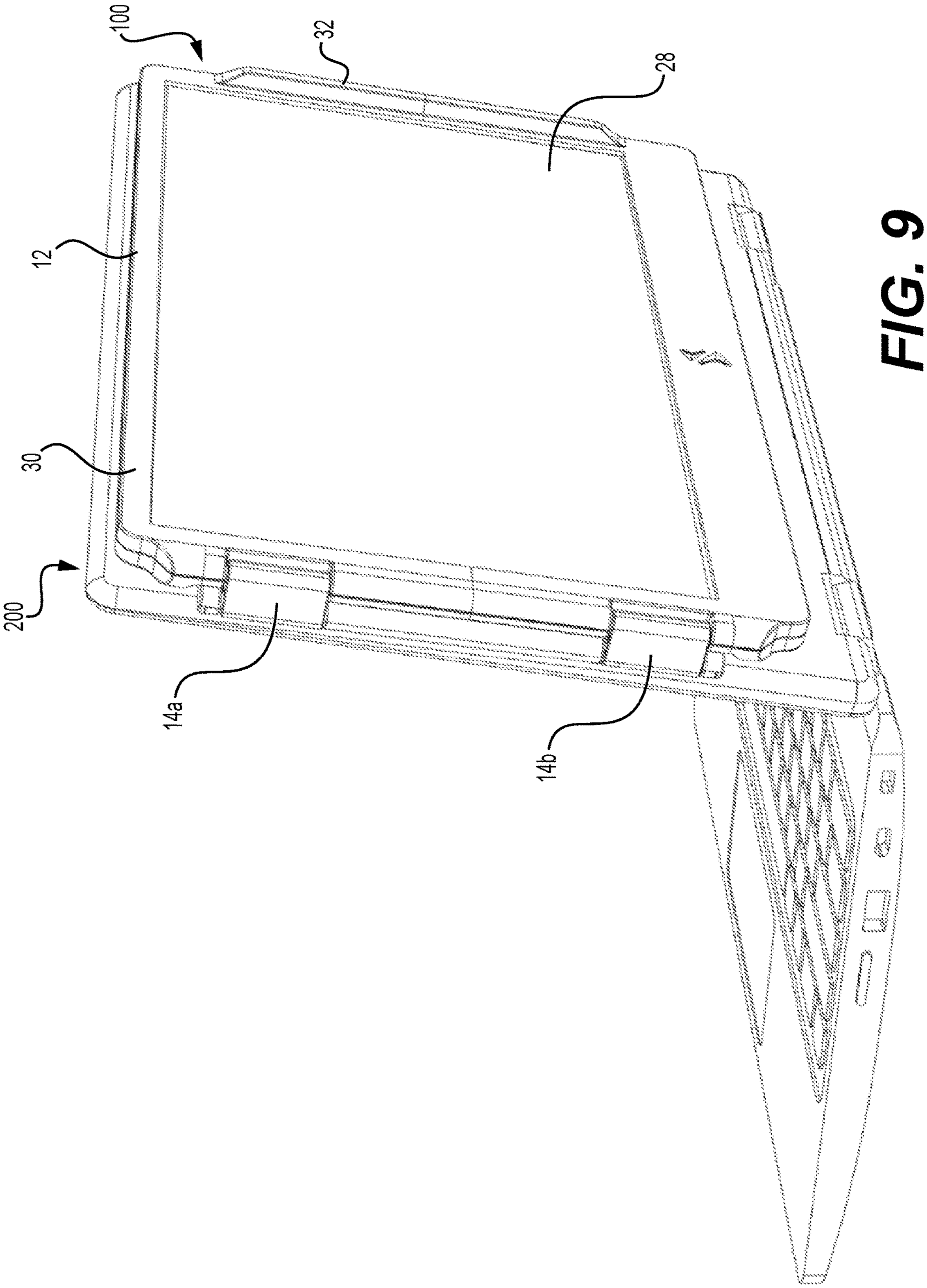
FIG. 9 is a rear perspective view of the portable electronic device having the attachable display device of FIG. 1 mounted thereon and in the presentation position according to one embodiment of the present disclosure.

As illustrated in FIG. 5B, the rear of the outer panel 30 may include an indentation 34 configured for receiving the mount 10 therein. In this embodiment, the indentation 34 has a shape complementary to the shape of the mount 10 so that the display screen 12 can lie flat against the mount 10 when the display screen 12 is configured in the presentation position, as shown in FIG. 9. In the illustrated embodiment, the shape of the indentation 34 is that of a sideway U-shape to complement the shape of the mount 10 shown in FIGS. 1 and 2A-2B. In further embodiments, the outer panel 30 may also include one or more steel plates (not shown) embedded within the interior of the outer panel 30 and positioned adjacent to the indentation 34. The steel plates are configured to align with the closing magnets 74 (shown in FIG. 6A) embedded within the mount 10 to help keep the display screen 12 tightly secured to the mount 10 when closed and in the stored position.

The screen portion 28 may be any type of external electronic display including, but not limited to, an electroluminescent (ELD) display, liquid crystal display (LCD), light emitting diode (LED) display (e.g., organic light emitting diode (OLED) or microLED), plasma display panel (PDP), quantum dot (QLED) display, and a touch screen display. In a preferred embodiment, the screen portion 28 is an LCD display. In some embodiments, the screen portion 28 may also have a tempered glass screen protector installed thereon for protection.

Figure 6:
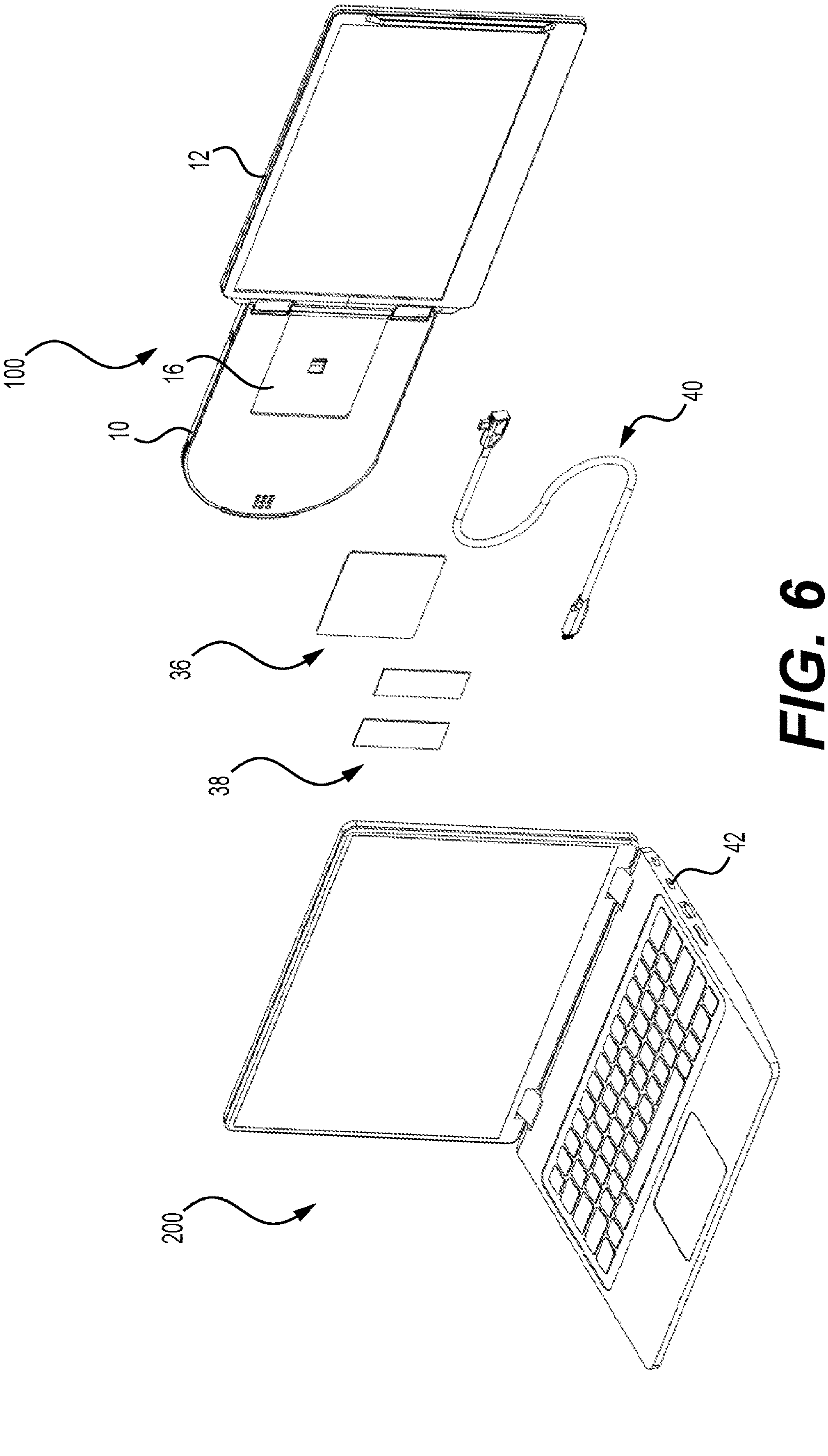
FIG. 6 is an exploded view of the attachable display device of FIG. 1 attached to a portable electronic device according to one embodiment of the present disclosure.

FIG. 6 shows an exemplary mechanism for securing the attachable display screen 100 to a portable electronic device 200. As discussed above, the attachable display screen 100 is configured to be removably mounted onto a surface of the portable electronic device 200 to provide the user with an additional display monitor. In this embodiment, the portable electronic device 200 includes an attachment mechanism configured for attaching to the mount 10 on the attachable display screen 100. In one embodiment, the attachment mechanism is a sticker 36 configured to magnetically attach to the magnets embedded within the recess 16. For example, the sticker 36 may be made of metal or steel. As illustrated in FIG. 6, a first side of the sticker 36 is configured to secure to a surface of the portable electronic device 200 and the opposite side is configured to be received within the recess 16. The sticker 36 can be attached to the surface of the portable electronic device 200 using a fastener 38. In one embodiment, the fastener 38 may be an adhesive, such as a pressure sensitive adhesive or double-sided tape. As illustrated in FIG. 6, two fasteners 38 are used to attach the sticker 36 to the surface of the portable electronic device 200. However, as will be appreciated by those skilled in the art, any number of fasteners 38 may be used to attach the sticker 36 to the surface so long as a secure connection is formed.

The recess 16 is configured to receive the sticker 36 attached to the surface of the portable electronic device 200. In this embodiment, the sticker 36 may securely connect to the magnets that are embedded within the recess 16. The magnets embedded within the recess 16 attach to the sticker 36 by a magnetic force, which provides a secure connection onto the portable electronic device 200 and prevents the attachable display screen 100 from moving during use (but is still removable with sufficient force). In some embodiments, the sticker 36 may be complementary in shape to the recess 16 such that the sticker 36 fits securely within the recess 16. In addition, while a single sticker 36 is shown in FIG. 6, any number of stickers 36 may be used so long as the stickers fit securely within the recess 16.

The attachable display screen 100 is configured to be communicatively coupled to the portable electronic device 200 via a wired connection 40. In this embodiment, the portable electronic device 200 may include a communications port 42 configured to be coupled to the external communications port 26 on the mount 10 via the wired connection 40 to establish communication with the attachable display screen 100. In this embodiment, the wired connection 40 may be a direct electrical connection using a cord and a compatible plug for engagement with the external communications port 26. For example, the communications port 42 and the external communications port 26 may be configured using any one or combination of the following: a USB connector, USB-A connector, USB-C connector, mini-USB connector, micro-USB connector, high-definition multimedia interface (HDMI) connector, mini-HDMI, DisplayPort, mini-DisplayPort, and DisplayLink. In one embodiment, the communications port 42 and the external communications port 26 may be configured using a USB type-C connector for use with a USB type-C cord. In another embodiment, the communications port 42 and the external communications port 26 may be configured using a USB type-A connector for use with a USB type-A cord.

In other embodiments, the attachable display screen 100 may establish communication with the portable electronic device 200 through a wireless connection. In one embodiment, the attachable display screen 100 is configured to be communicatively coupled to the portable electronic device 200 via a pogo pin connection. A pogo pin is a device used in electronics to establish a connection between two printed circuit boards (PCBs). Pressed between two electronic circuits, points at each end of the pogo pin can make contacts with two electronic circuits, connecting the two electronic circuits together.

Figure 6A:
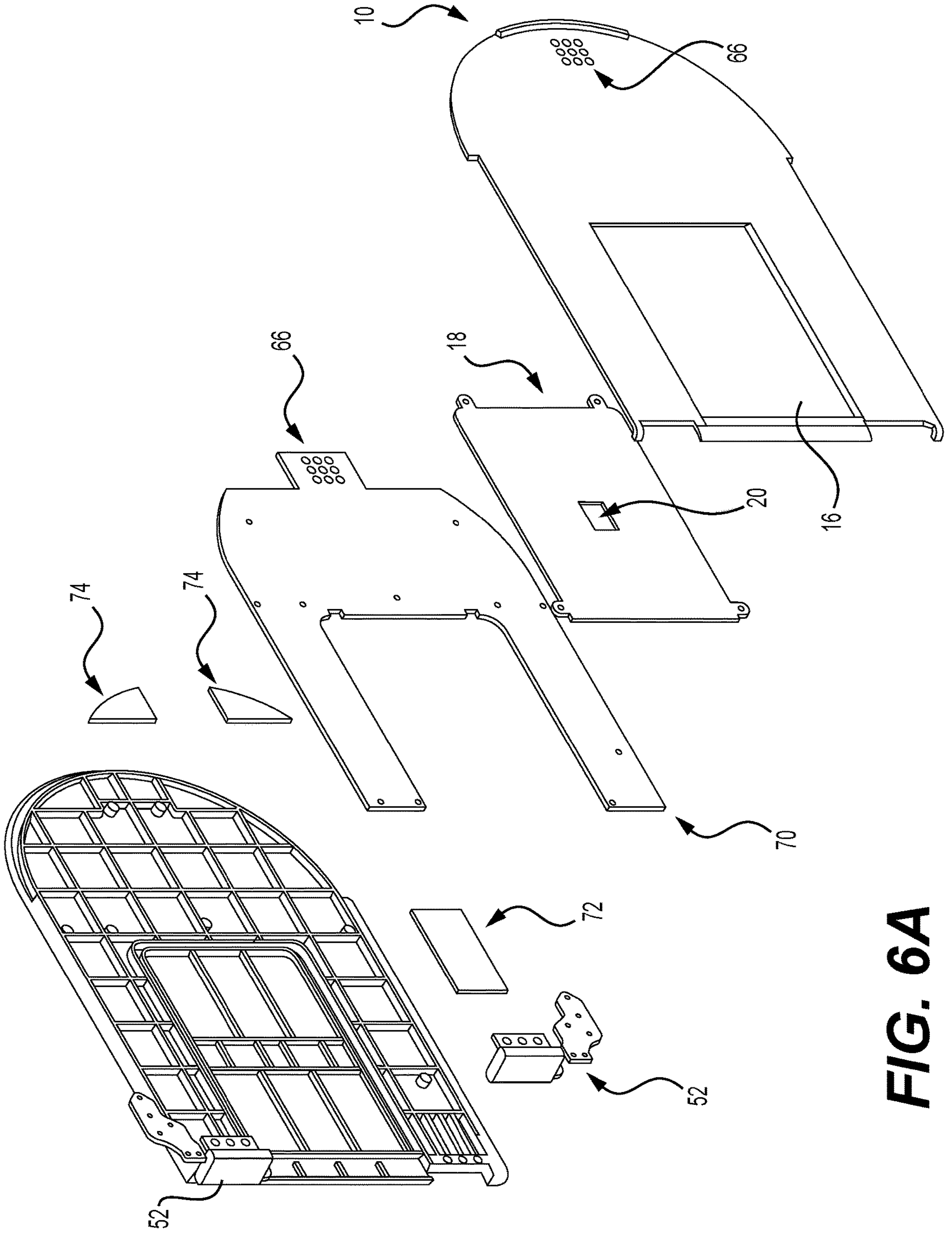
FIG. 6A is an exploded view of the mount portion of the attachable display device according to another embodiment of the present disclosure.
Figure 6B:
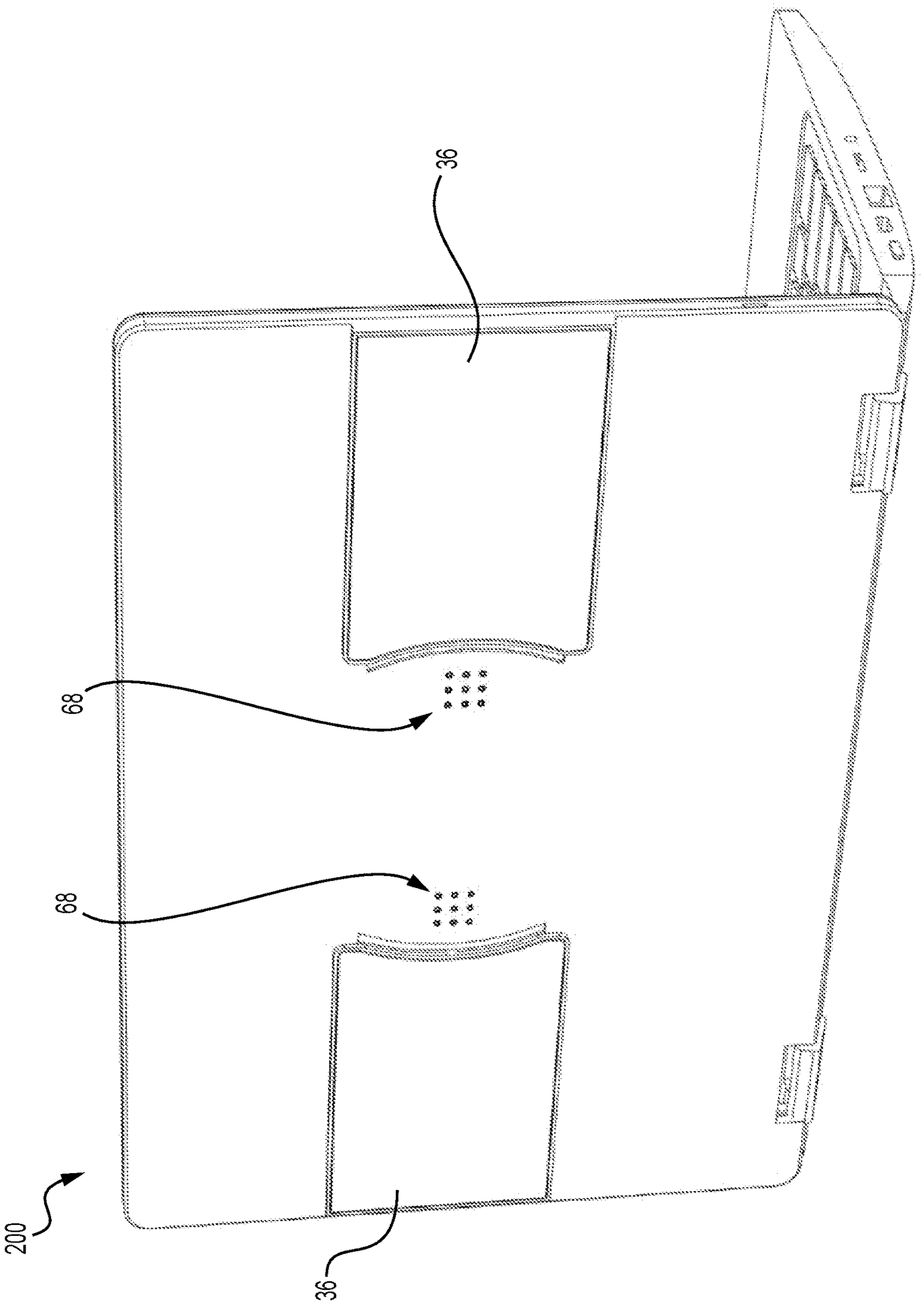
FIG. 6B is a rear perspective view of the portable electronic device according to another embodiment of the present disclosure.

FIGS. 6A and 6B illustrate a pogo pin connection according to one embodiment of the present disclosure. As shown in FIGS. 6A and 6B, the mount 10 can have a first portion of the pogo pin connector 66 coupled thereto and the portable electronic device 200 can have a second portion of a pogo pin connector 68 coupled thereto. The second portion 68 can receive the first portion 66 when the mount 10 is operatively connected to the portable electronic device 200. This establishes communication between the attachable display screen 100 and the portable electronic device 200 without the need for a wired connection. The established pogo pin connection can support high speed signals. For example, the pogo pin connection can support speeds of 400 megabits per second up to 10 gigabits per second.

In the illustrated embodiment, the first portion of the pogo pin connector 66 located on the mount 10 includes nine pogo pads. The pogo pads may be mounted on the control board 70 positioned within the mount 10. The second portion of the pogo pin connector 68 located on the portable electronic device 200 includes nine pogo pins configured for engagement with each of the pogo pads on the mount 10. The pogo pins (and the corresponding pogo pads) are shown in a 3×3 configuration with a distance of about 4 mm to about 5 mm from the center of one pin to the center of another pin. As shown in FIG. 6B, the portable electronic device 200 may include two sets of pogo pin connectors 68 to accommodate different positions of the mount 10.

While a pogo pin connection has been described herein as an exemplary wireless connection, one of ordinary skill in the art will appreciate that other wireless connections can be used to communicatively couple the attachable display screen 100 to the portable electronic device 200. For example, the attachable display screen 100 may be wirelessly connected to the portable electronic device 200 using Wi-Fi, 802.11ac wireless, DLNA, Bluetooth, NFC, or the like.

Figure 7:
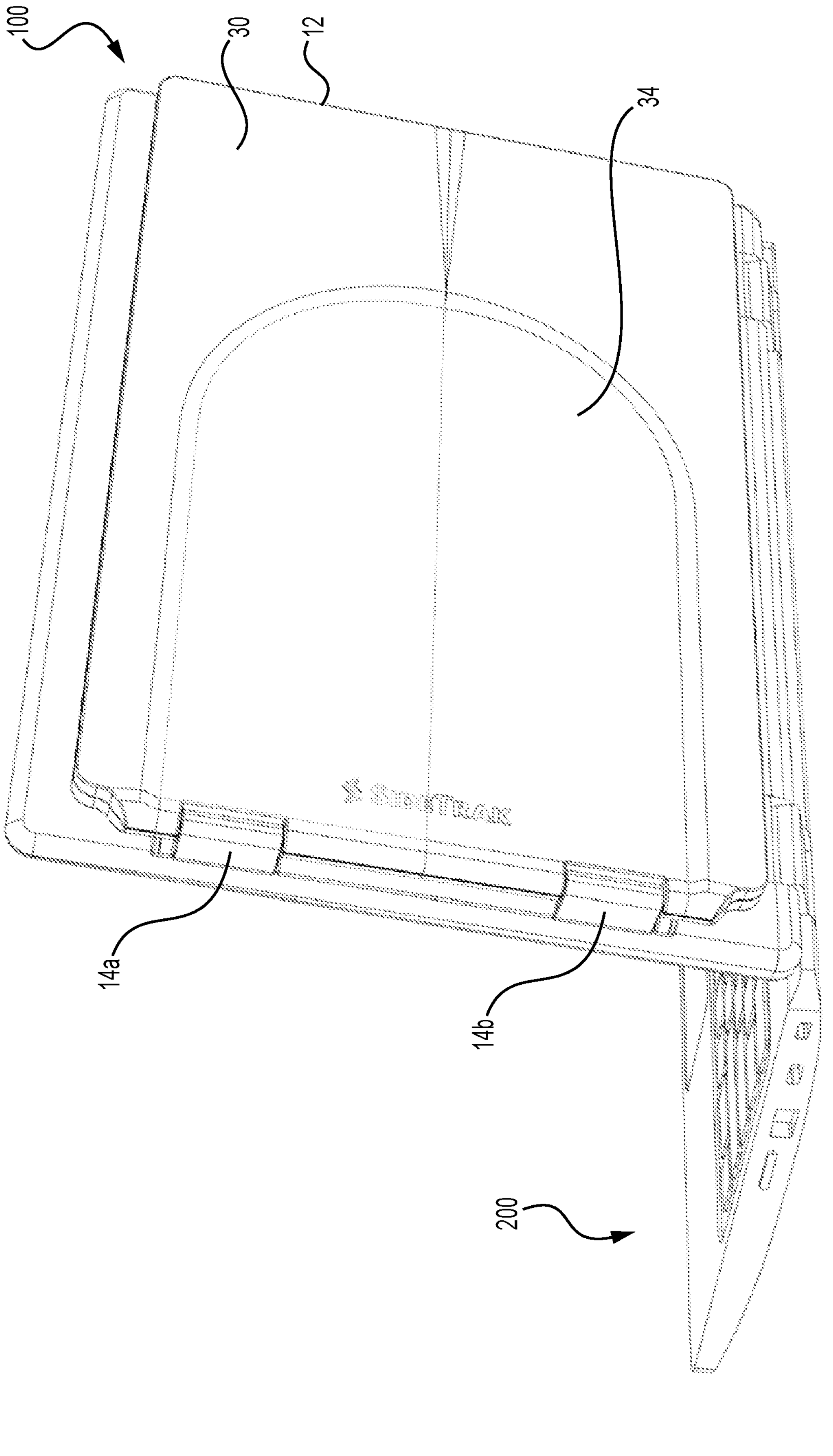
FIG. 7 is a rear perspective view of the portable electronic device having the attachable display device of FIG. 1 mounted thereon and in the closed position according to one embodiment of the present disclosure.

FIG. 7 is a rear perspective view of the portable electronic device 200 having the attachable display screen 100 mounted thereon and in the closed position. As shown in FIG. 7, when the attachable display screen 100 is in the closed position, the recess 16 on the back of the mount 10 is magnetically engaged with the sticker 36 positioned on the back of the portable electronic device 200 such that the screen portion 28 lies flat against the mount 10 while the rear of the outer panel 30 faces outwardly. In this embodiment, the steel plate(s) embedded within the interior of the outer panel 30 are aligned and magnetically engaged with the closing magnets 74 embedded within the mount 10 to help keep the display screen 12 tightly secured.

Figure 8A:
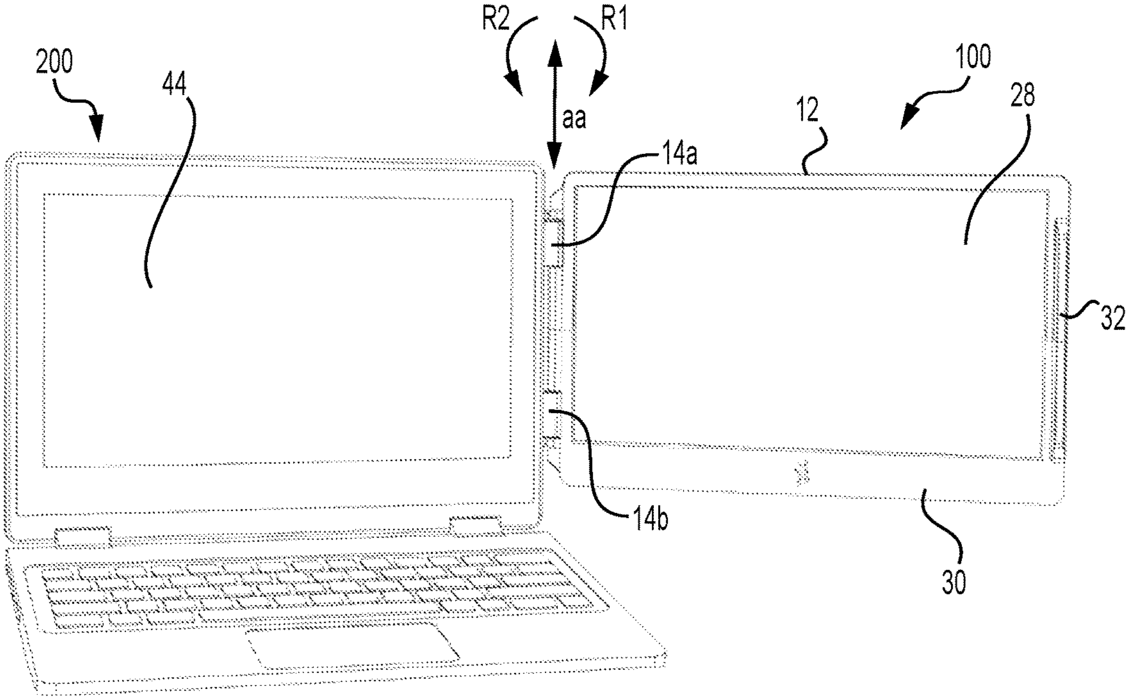
FIG. 8A is a front perspective view of the portable electronic device having the attachable display device of FIG. 1 mounted thereon and in the open or extended position according to one embodiment of the present disclosure.
Figure 8B:
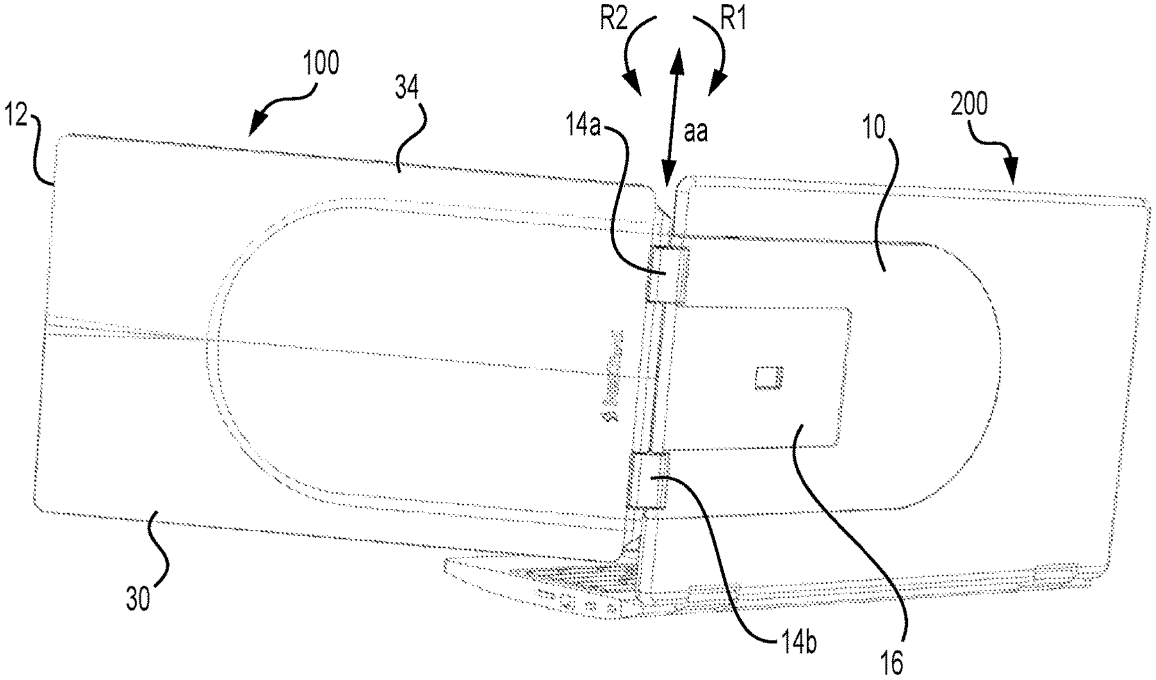
FIG. 8B is a rear perspective view of the portable electronic device having the attachable display device of FIG. 1 mounted thereon and in the open or extended position according to one embodiment of the present disclosure.

FIGS. 8A and 8B are front and rear perspective views, respectively, of the portable electronic device 200 having the attachable display screen 100 mounted thereon and in the open or extended position. In this aspect, the display screen 12 is positionable in an extended position thereby allowing viewing of both a screen 44 of the portable electronic device 200 and the display screen 12. As shown in FIGS. 8A and 8B, when the attachable display screen 100 is in the open or extended position, the recess 16 on the front of the mount 10 is magnetically engaged with the sticker 36 positioned on the back of the portable electronic device 200. In this embodiment, the user can transition between the closed position (shown in FIG. 7) and the open position (shown in FIGS. 8A and 8*b*) by detaching the mount 10 from the sticker 36 on the back of the portable electronic device 200, flipping the mount 10 about 180 degrees such that the recess 16 on the front of the mount 10 is aligned with the sticker 36, and engaging the recess 16 on the front of the mount 10 with the sticker 36.

The display screen 12 is configurable to swing out from behind the portable electronic device 200 so that a user can utilize a second display screen when the attachable display screen 100 is mounted onto the portable electronic device 200. The display screen 12 is configured to swing from a closed position, as illustrated in FIG. 7, to an open or extended position, as illustrated in FIGS. 8A and 8B, via the hinges 14*a*, 14*b*. In some embodiments, the hinges 14*a*, 14*b* allow the display screen 12 to rotate about a vertical axis aa relative to the portable electronic device 200 in rotation directions R1 and R2 (which are opposite to each other). When rotated in direction R1, the display screen 12 may be angled toward the user. The display screen 12 can be rotated in direction R1 until the display screen 12 interferes with the screen 44 of the portable electronic device 200. When rotated in direction R2, the display screen 12 may be angled away from the user. In other words, the hinges 14*a*, 14*b* allow the display screen 12 to adjust from a plane-like display as shown in FIG. 7 to an extended display state as shown in FIGS. 8A and 8B which allows the user to obtain a preferable view angle range and visual effect. In some embodiments, the display screen 12 has a maximum degree of rotation of about the vertical axis aa of about 270 degrees.

The hinges 14*a*, 14*b* are designed to provide continual resistance throughout the entire range of motion in adjusting the display screen 12, making it possible to easily position the display screen 12 securely at a desired angle. Any suitable torque hinge or constant torque friction hinge may be used in accordance with the present disclosure. The display screen 12 may also be opened to the left or the right of the screen 44 of the portable electronic device 200 depending on the user's preference. In the illustrated embodiment, the display screen 12 is deployed to the right. However, the mount 10 may be flipped or inverted so that the display screen 12 is deployed to the left.

FIG. 9 is a rear perspective view of the portable electronic device 200 having the attachable display screen 100 mounted thereon in a presentation position. As can be seen in FIG. 9, the hinges 14*a*, 14*b* allow for the display screen 12 to fully rotate in direction R2 along vertical axis aa to an angle of 180 degrees such that the display screen 12 can be viewed from the rear of the portable electronic device 200. This allows for the display screen 12 to be deployed in a presentation position for viewing by another user opposite the user positioned in front of the portable electronic device 200.

Figure 10:
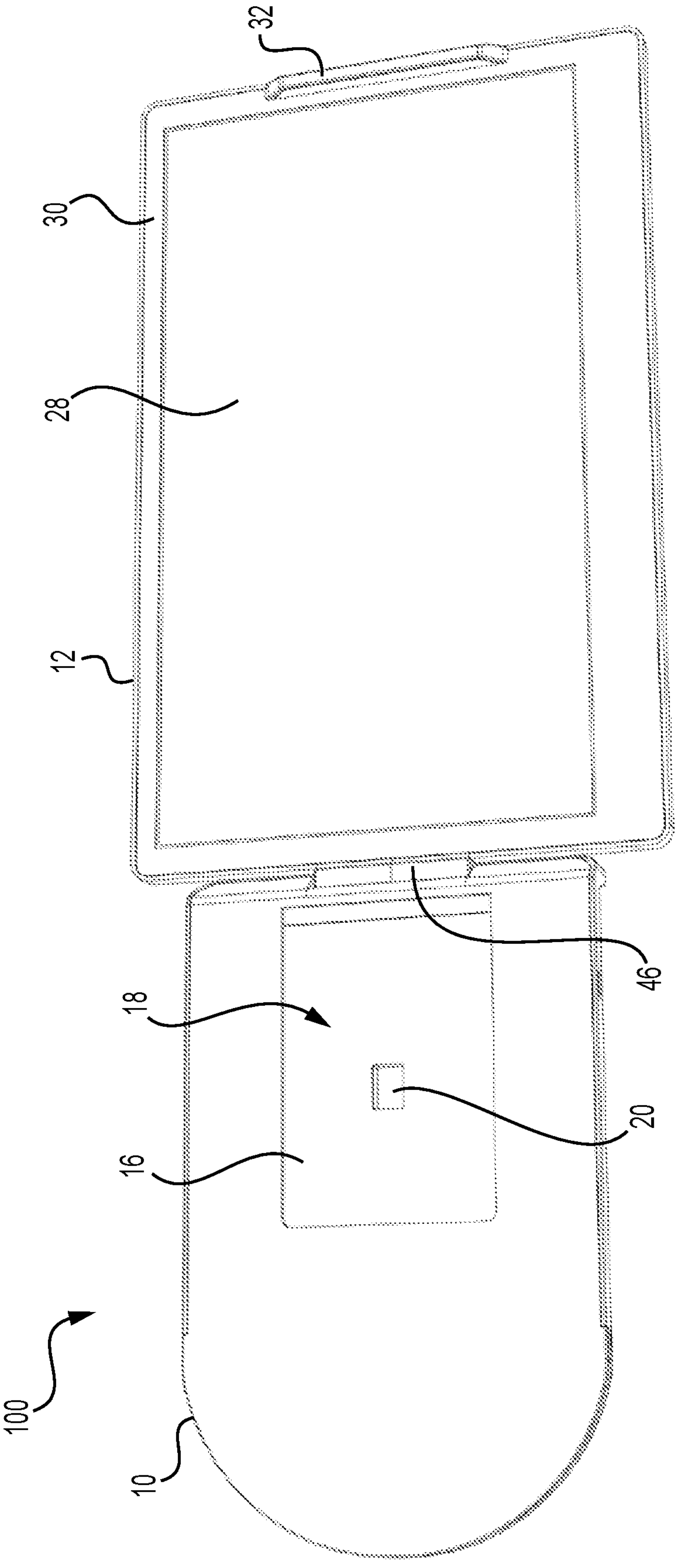
FIG. 10 is a front perspective view of an attachable display device according to another embodiment of the present disclosure.

FIG. 10 shows the attachable display screen 100 having a hinge mechanism according to another embodiment of the present disclosure. In this embodiment, the mount 10 is operatively attached to the display screen 12 by a torque hinge 46 having a pivot point that allows the display screen 12 to swivel a full 360 degrees about the mount 10. The torque hinge 46 makes it possible to not only deploy the display screen 12 between the closed and open/extended positions (like the embodiment described above with respect to FIGS. 1-9), but also securely tilt the display screen 12 to any desired angle. The ability of the display screen 12 to swivel about the mount 10 also dispenses of the need for the recess on the back of the mount 10. That is, the display screen 12 can be opened and closed without the need to flip the configuration of the mount 10.

Figure 11A:
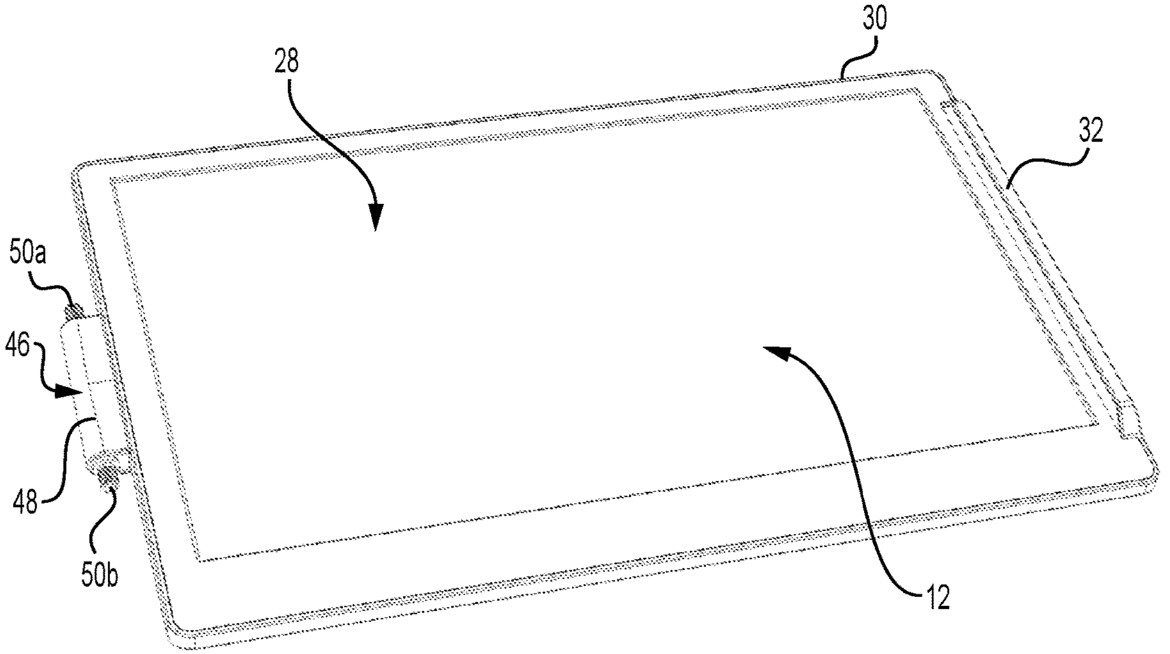
FIG. 11A is a front perspective view of the display screen of the attachable display device shown in FIG. 10 according to one embodiment of the present disclosure.
Figure 11B:
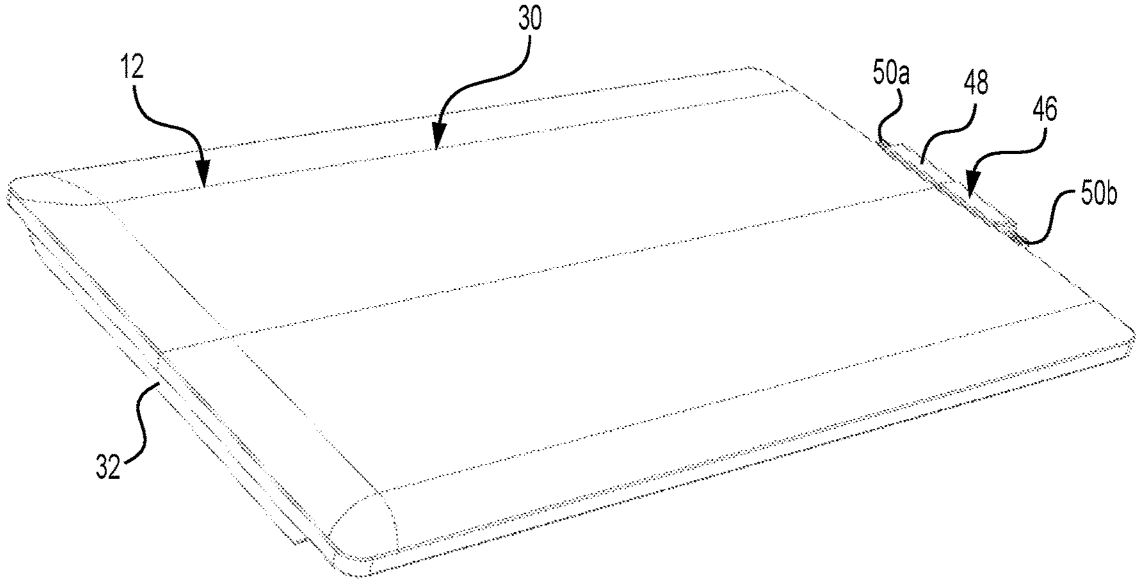
FIG. 11B is a rear perspective view of the display screen shown in FIG. 11A.

FIGS. 11A and 11B show a front and rear view, respectively, of the display screen 12 with the torque hinge 46 attached thereto. As shown in FIGS. 11A and 11B, the torque hinge 46 is formed of an elongated structure 48 having two projections 50*a*, 50*b* protruding from each end. The projections 50*a*, 50*b* are configured for engagement with corresponding holes disposed on the mount 10. The projections 50*a*, 50*b* serve as hinges that allow for rotation of the display screen 12 about the vertical axis aa, as will be described in more detail below. The torque hinge 46 is operatively connected to the display screen 12 at a pivot point (not shown). The pivot point allows for complete vertical adjustability of the display screen 12 about the mount 10. That is, the torque hinge 46 allows for the display screen 12 to swivel or tilt upward and downward relative to the screen 44 of the portable electronic device 200 upon which the attachable display screen 100 is mounted. The pivot point also allows the user to adjust the horizontal viewing angle of the display screen 12. In some embodiments, the torque hinge 46 allows for the display screen 12 to swivel 360 degrees about the pivot point.

In some embodiments, when the display screen includes the torque hinge 46 shown in FIG. 10 and FIGS. 11A-11B, the electrical connector can be fed through the torque hinge 46 to connect the control board in the mount 10 to electronics in the display screen 12. For example, in one embodiment, the electrical connector can be fed around the pivot point of the torque hinge 46 so as not to interfere with the rotation of the torque hinge 52.

While the torque hinge 46 has been described herein as illustrated in FIGS. 11A and 11B, any suitable torque hinge or constant torque friction hinge may be used in accordance with the present disclosure. In addition, any number of torque hinges may be utilized with the attachable display screen 100 to provide adjustability. For instance, the attachable display screen 100 may include two or more separate torque hinges. In another embodiment, the attachable display screen 100 may include three or more separate torque hinges.

Figure 12:
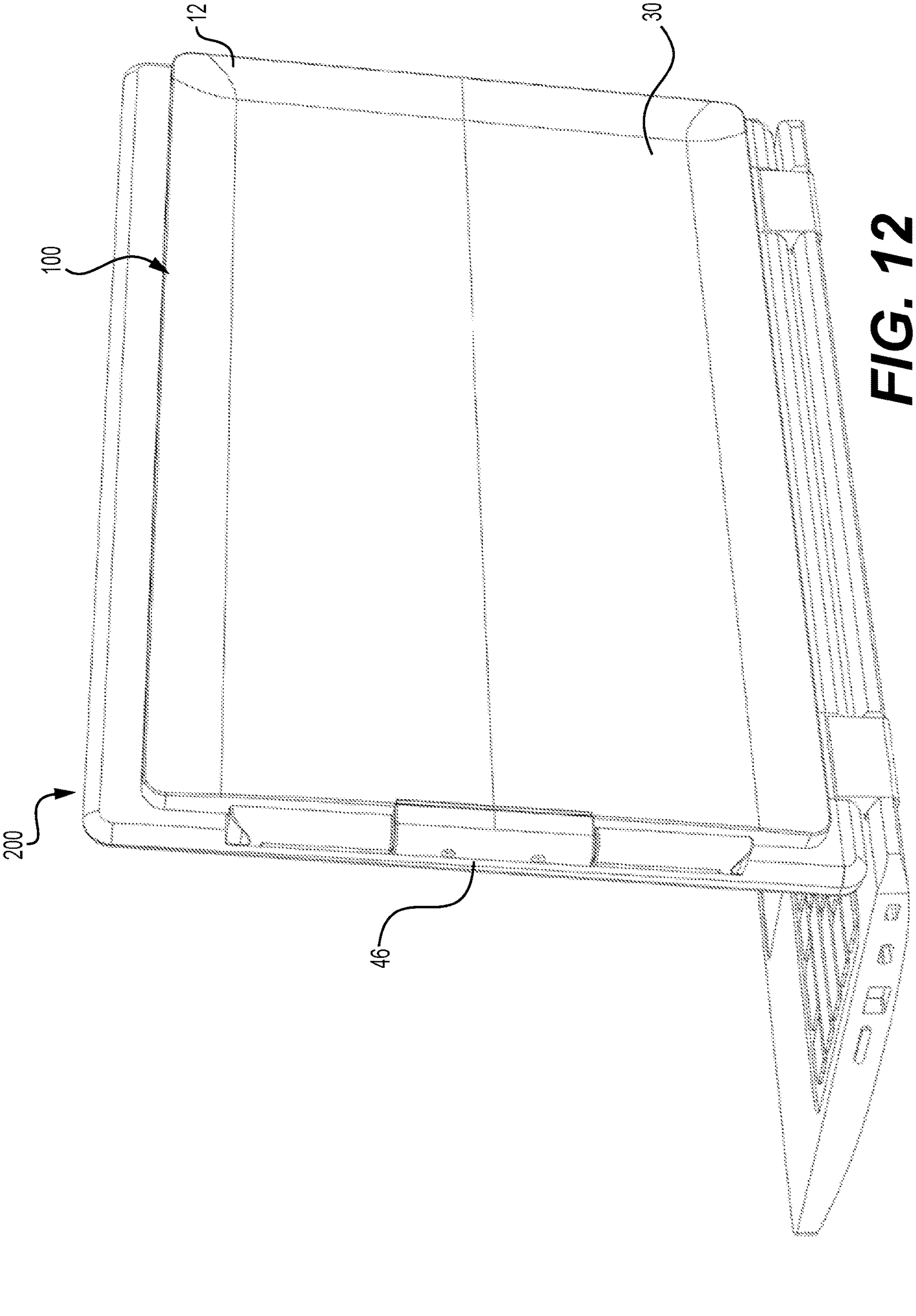
FIG. 12 is a rear perspective view of the portable electronic device having the attachable display device of FIG. 10 mounted thereon and in the closed position according to one embodiment of the present disclosure.

FIG. 12 is a rear perspective view of the portable electronic device 200 having the attachable display screen 100 shown in FIG. 10 mounted thereon and in the closed position. When the attachable display screen 100 is in the closed position, the recess 16 on the front of the mount 10 is magnetically engaged with the sticker 36 positioned on the back of the portable electronic device 200 such that the screen portion 28 lies flat against the mount 10 while the rear of the outer panel 30 faces outwardly. In this embodiment, the steel plate(s) embedded within the interior of the outer panel 30 are aligned and magnetically engaged with the closing magnets 74 embedded within the mount 10 to help keep the display screen 12 tightly secured.

Figure 13A:
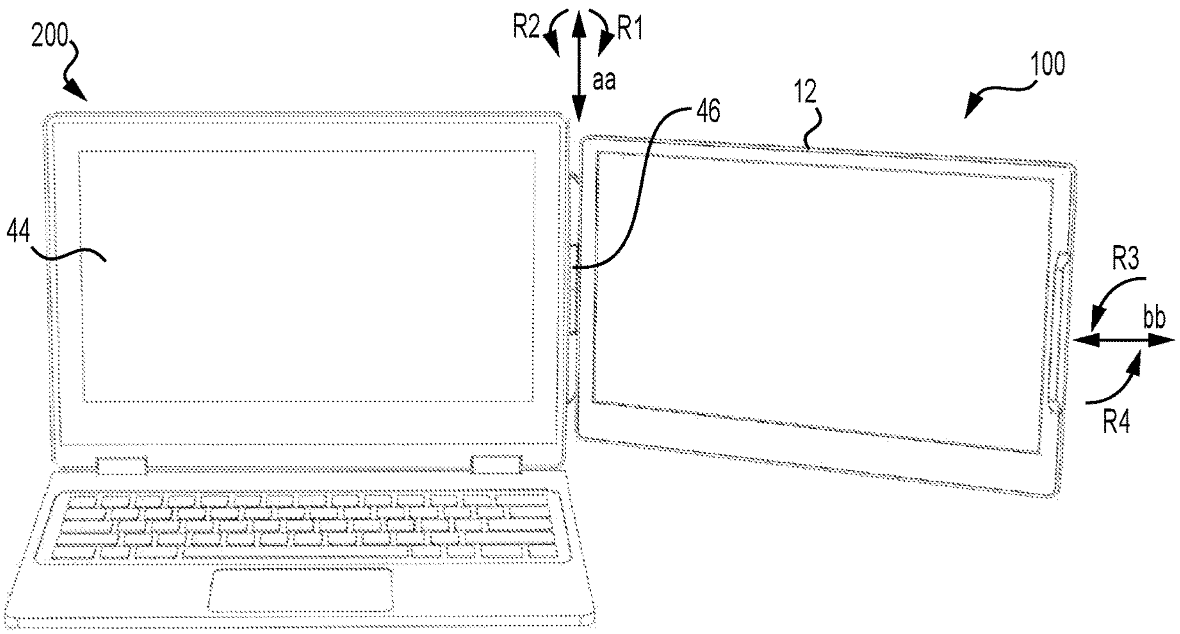
FIG. 13A is a front perspective view of the portable electronic device having the attachable display device of FIG. 10 mounted thereon and in the open or extended position according to one embodiment of the present disclosure.
Figure 13B:
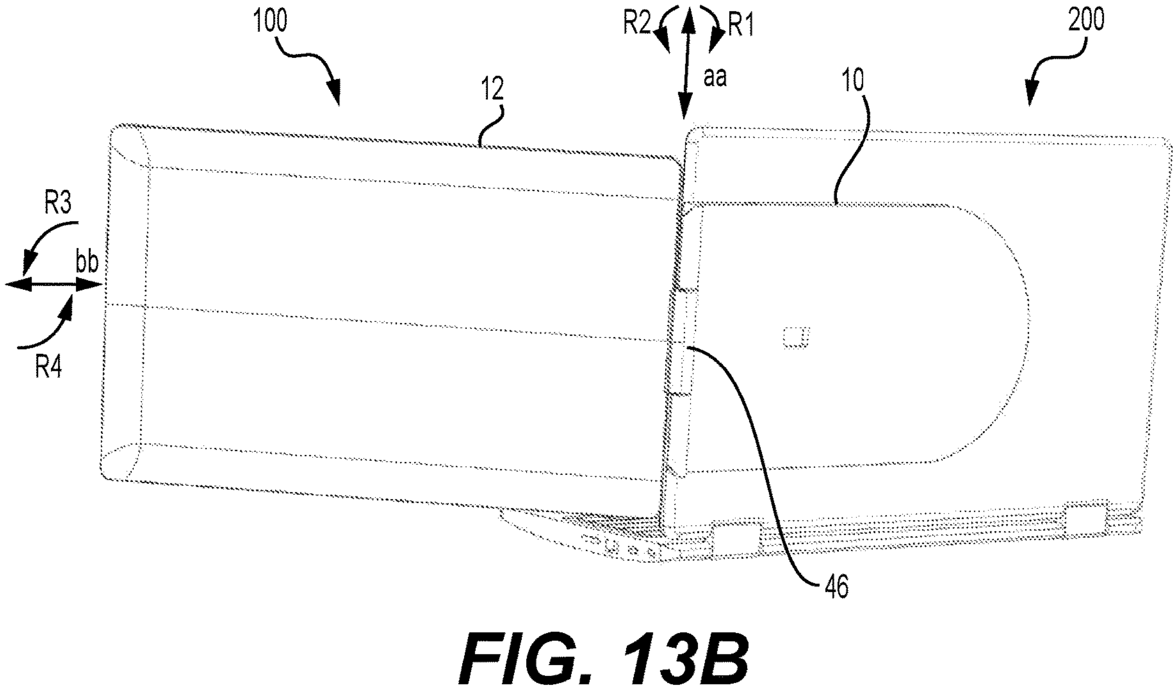
FIG. 13B is a rear perspective view of the portable electronic device having the attachable display device of FIG. 10 mounted thereon and in the open or extended position according to one embodiment of the present disclosure.

FIGS. 13A and 13B are front and rear perspective views, respectively, of the portable electronic device 200 having the attachable display screen 100 shown in FIG. 10 mounted thereon and in the open or extended position. With the use of the torque hinge 46, the display screen 12 is configurable to swing out from behind the mount 10 (when in the closed position) so that a user can utilize a second display screen when the attachable display screen 100 is mounted onto the portable electronic device 200. The display screen 12 is configured to swing from a closed position, as illustrated in FIG. 12, to an open or extended position, as illustrated in FIGS. 13A and 13B, via the torque hinge 46. The display screen 12 may be opened to the left or the right of the screen 44 of the portable electronic device 200 depending on the user's preference. In the illustrated embodiment, the display screen 12 is deployed to the right. However, the mount 10 may be flipped or inverted so that the display screen 12 is deployed to the left.

Like the attachable display screen 100 shown in FIGS. 8A and 8B, the display screen 12 can rotate about the vertical axis aa relative to the portable electronic device 200 in rotation directions R1 and R2. However, with the use of the torque hinge 46, the display screen 12 can also fully rotate about a horizontal axis bb. The user can adjust the display screen 12 by tilting the display screen 12 upward or downward. When rotated in direction R3, the display screen 12 may be tilted downward. When rotated in direction R4, the display screen 12 can be titled upward. In this embodiment, the display screen 12 can be rotated in direction R3 or direction R4 in a complete circle (i.e., 360 degrees).

Figure 14:
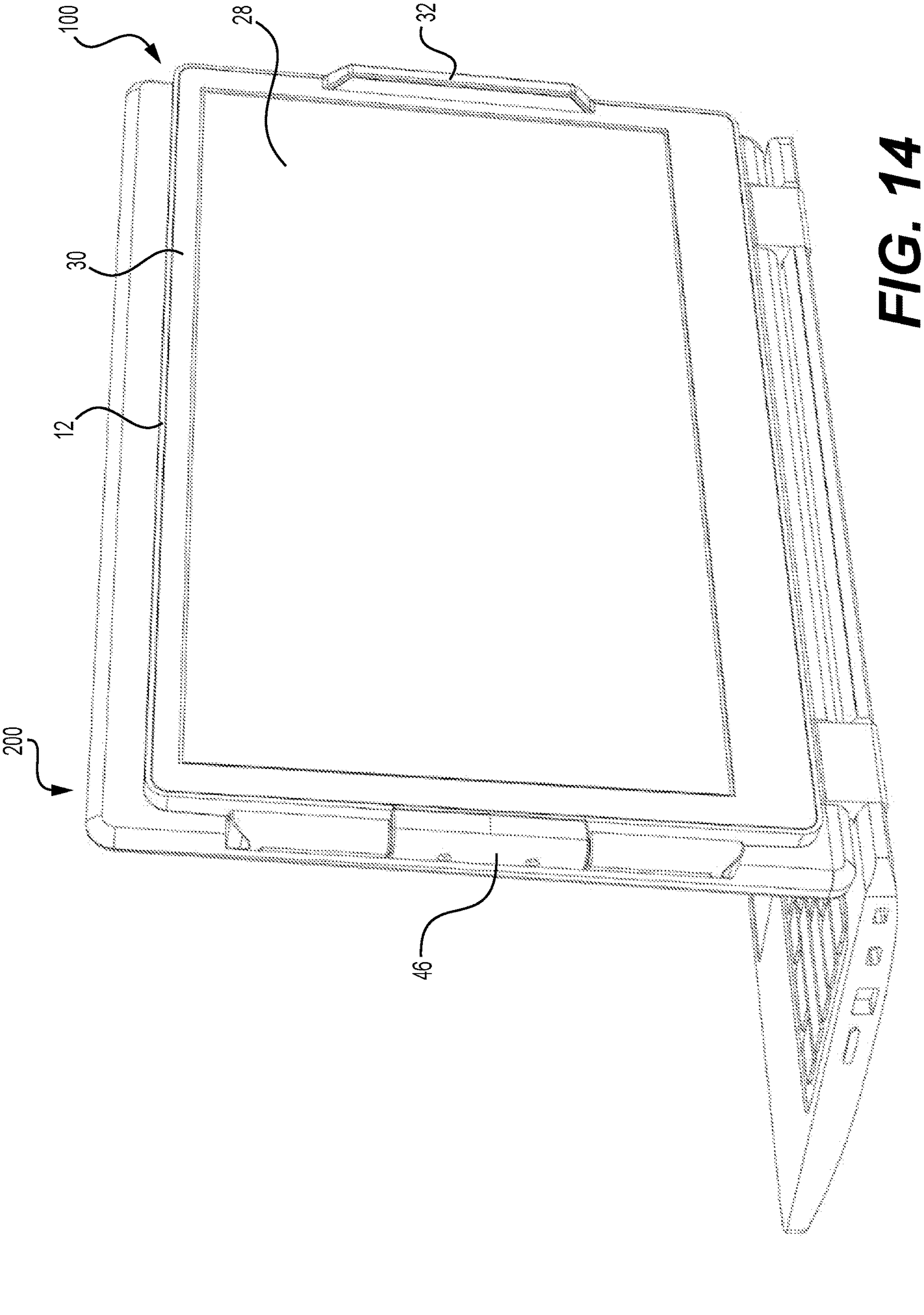
FIG. 14 is a rear perspective view of the portable electronic device having the attachable display device of FIG. 10 mounted thereon and in the presentation position according to one embodiment of the present disclosure.

FIG. 14 is a rear perspective view of the portable electronic device 200 having the attachable display screen 100 shown in FIG. 10 mounted thereon in a presentation position. In this embodiment, the user may desire to rotate the display screen 12 to an angle of 180 degrees and swing the display screen 12 to the closed position such that the display screen 12 can be viewed from the rear of the portable electronic device 200. This allows for the display screen 12 to be deployed in a presentation position for viewing by another user opposite the user positioned in front of the portable electronic device 200.

Figure 15:
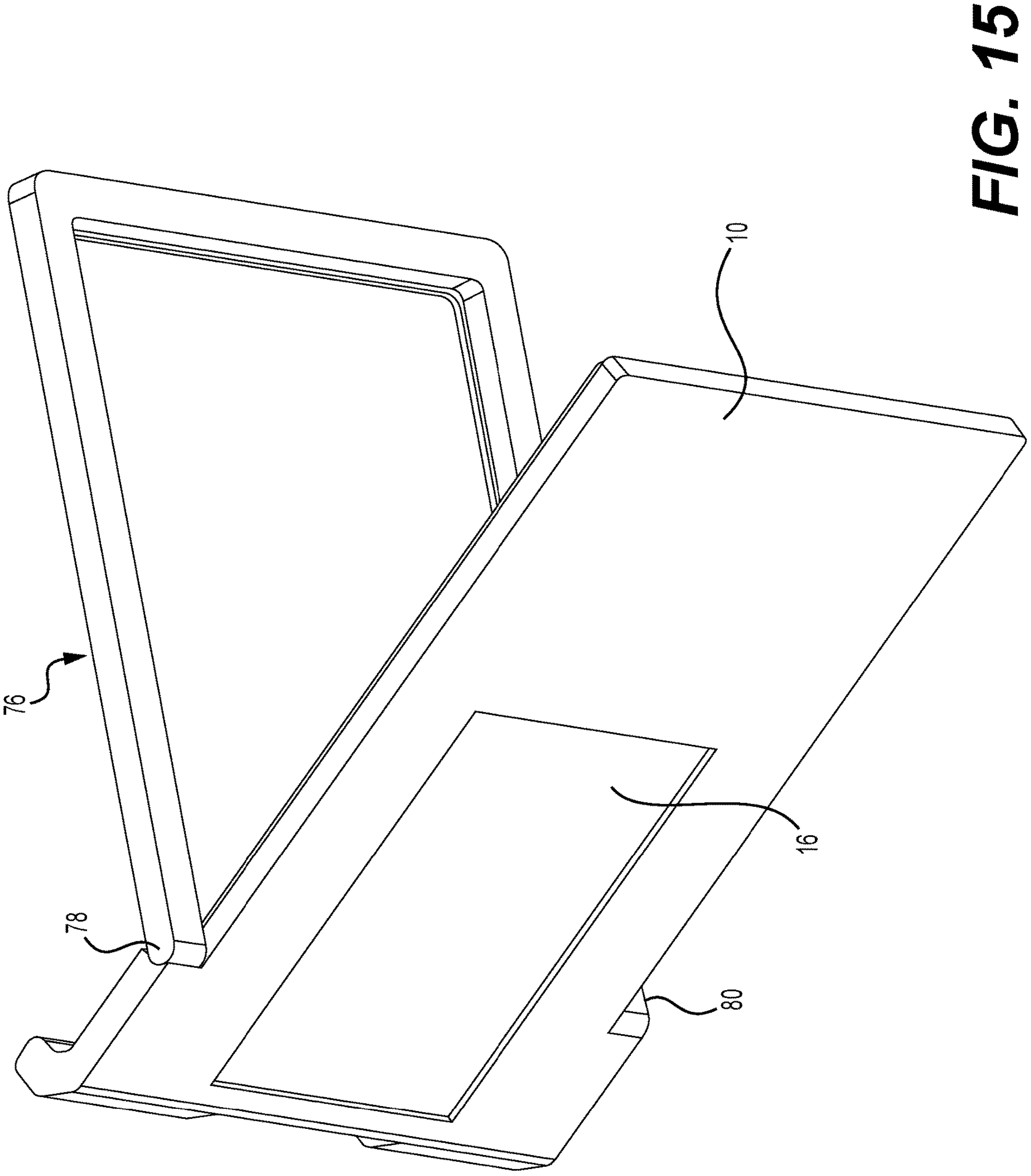
FIG. 15 is a front perspective view of a kickstand attached to the mount according to one embodiment of the present disclosure.

FIG. 15 is a front perspective view of a kickstand 76 attached to the mount 10 according to one embodiment of the present disclosure. The kickstand 76 can provide support when the attachable display screen 100 is in an open or extended position. In some embodiments, as shown in FIG. 15, the kickstand 76 is rotatably attached to the mount 10. The kickstand 76 can rotate to various positions to provide support for the attachable display screen 100. For instance, when the kickstand 76 is rotated away from the mount 10, the kickstand 76 can rotate to an angle of up to about 100 degrees while supporting the attachable display screen 100. In another embodiment, the kickstand 76 can rotate to an angle of about 10 degrees to about 90 degrees while supporting the attachable display screen 100. In still another embodiment, the kickstand 76 can rotate to an angle of about 20 degrees to about 80 degrees while supporting the attachable display screen 100. In yet another embodiment, the kickstand 76 can be rotated to an angle of about 90 degrees to provide optimal support. When in the open position, the kickstand 76 can sufficiently support the weight of the attachable display screen 100.

In one embodiment, the kickstand 76 is operatively attached to the mount 10 at an upper connection point 78 and a lower connection point 80. The upper and lower connection points 78, 80 allow for the kickstand 76 to rotate away from the mount 10 and provide constant resistance throughout the entire range of rotation, enabling a user to position the kickstand 76 at any desired angle. The kickstand 76 can be attached to the mount 10 at the upper and lower connection points 78, 80 using any suitable attachment mechanism. For example, the kickstand 76 may be attached to the mount 10 via screws, pins, or projections.

In another embodiment, the kickstand 76 may be releasably attached to the mount 10. In this embodiment, the kickstand 76 may be opened from the mount 10 via spring activation. In still another embodiment, the kickstand 76 may be releasably attached to the mount 10 via a magnetic force. In this embodiment, a magnet (not shown) may be positioned on a side of the mount 10 opposite the hinge(s). The magnet can provide a secure connection between the kickstand 76 and the mount 10 when not in use but is still able to be opened with sufficient force. In yet another embodiment, the kickstand 76 may be releasably attached to the mount 10 by a ratcheting mechanism. In this embodiment, the ratcheting mechanism can lock the kickstand 76 in place on the mount 10 until the kickstand 76 is opened.

As shown in FIG. 15, the kickstand 76 has a cut-out U-shape so that the kickstand 76 may be integral with and forms a portion of the mount 10 when in the closed position. The cut-out shape improves the portability and compactness of the kickstand 76 and reduces the impact on the internal and external volume and size of the attachable display screen 100. In this embodiment, the kickstand 76 can be stored within the mount 10 when the attachable display screen 100 is attached to a surface of the portable electronic device 200. In one embodiment, the size and shape of the kickstand 76 conforms to the size and shape of the mount 10 such that the kickstand 76 does not protrude from the plane formed by the mount 10 when in the closed position. For instance, the shape and size of the kickstand 76 conforms to the contour of the mount 10 such that the kickstand 76 is integral with the mount 10. While the kickstand 76 has been illustrated herein as a cut-out U-shape, one of ordinary skill in the art will recognize that the kickstand 76 may be formed into a variety of shapes and sizes.

In some embodiments, the attachable display screen 100 may include other internal components including, but not limited to, electrical components such as display driver circuitry, one or more batteries, sensors, microphones, speakers, integrated circuits, microprocessors, power management units, radio-frequency transceiver circuitry, baseband processor circuitry, discrete components such as capacitors, resistors, and inductors, switches, vibrators, connectors, printed circuit boards, wires, transmission lines, and other electrical devices. The internal components may be mounted on one or more substrates such as rigid printed circuit boards (e.g., boards formed from fiberglass-filled epoxy such as FR4 printed circuit boards on which patterned metal traces have been formed), flexible printed circuit boards (e.g., "flex circuits" formed form sheets of polymer such as polyimide on which patterned conductive traces have been formed), rigid flex (e.g., boards with both rigid portions and flex circuit tails), plastic carriers, or other substrates.

The various components of the attachable display screen 100 described herein may be constructed or manufactured from materials, such as various polymers, plastics, stainless steel, aluminum, and combinations thereof. Similarly, the various parts described herein may be constructed according to various manufacturing methods including injection molding, milling, forging, extrusion, pressing, 3D printing, and other related manufacturing methods.

The device described and claimed herein is not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. An attachable display device, comprising:

a mount configured to be removably attached to a portable electronic device comprising a main display, a hinge operatively attached to the mount, a display screen attached to the mount via the hinge, wherein the display screen is operable to selectively transition between a closed position in which the display screen is positioned behind the mount and an open position in which the display screen extends outwardly of the mount to be exposed from one side of the mount, wherein the mount comprises a first portion of a pogo pin connector coupled to a front of the mount and a control board disposed therein, and wherein the portable electronic device comprises a second portion of the pogo pin connector coupled to a rear of the main display and configured to receive the first portion of the pogo pin connector, wherein signals are communicated from the portable electronic device to the control board via the pogo pin connector in response to engagement of the first portion with the second portion and the control board is configured to (i) deliver power from the portable electronic device to the display screen and (ii) receive a display signal from the portable electronic device and to transmit the display signal to the display screen.

2. The attachable display device of claim 1, wherein the mount comprises a recess having a magnet embedded therein and the recess is configured for receiving an attachment mechanism on the portable electronic device.

3. An attachable display device, comprising:

a mount configured to be removably attached to a portable electronic device comprising a main display, a torque hinge operatively attached to the mount, the torque hinge comprising a cover having an interior portion, a display screen attached to the mount via the pivot point of the torque hinge, wherein the display screen is operable to selectively transition between a closed position in which the display screen is positioned behind the mount and an open position in which the display screen extends outwardly of the mount to be exposed from one side of the mounting frame, and the display screen is configured to vertically rotate relative to the mount to allow the display screen to be placed in a tilted configuration, and wherein the mount comprises a first portion of a pogo pin connector coupled to a front of the mount and a control board disposed therein, the control board comprising an electrical connector configured to supply power to and communicate with the display screen, wherein the electrical connector operatively connects the control board to the display screen and is fed through the interior portion of the cover, and wherein the portable electronic device comprises a second portion of the pogo pin connector coupled to a rear of the main display and configured to receive the first portion of the pogo pin connector, wherein signals are communicated from the portable electronic device to the control board via the pogo pin connector in response to engagement of the first portion with the second portion and the control board is configured to (i) deliver power from the portable electronic device to the display screen and (ii) receive a display signal from the portable electronic device and to transmit the display signal to the display screen.

4. The attachable display device of claim 3, wherein the display screen is configured to vertically rotate 360 degrees about the pivot point.

5. The attachable display device of claim 3, wherein the electrical connector comprises a first end operatively connected to the control board and a second end operatively connected to an electrical panel disposed in the display screen.

6. The attachable display device of claim 5, wherein the electrical connector is fed through a space under the torque hinge and above a bottom portion of the cover.

7. The attachable display device of 3, wherein the mount comprises a recess having a magnet embedded therein and the recess is configured for receiving an attachment mechanism on the portable electronic device.

8. An attachable display device, comprising:

a mount configured to be removably attached to a portable electronic device comprising a main display, wherein the mount comprises a first portion of a pogo pin connector coupled to a front of the mount and a control board disposed therein, the control board configured to receive signals sent from the portable electronic device, a torque hinge operatively attached to the mount, the torque hinge comprising a pivot point, a display screen attached to the mount via the pivot point of the torque hinge, wherein the display screen is operable to selectively transition between a closed position in which the display screen is positioned behind the mount and an open position in which the display screen extends outwardly of the mount to be exposed from one side of the mount, and the display screen is configured to vertically rotate 360 degrees about the pivot point, and wherein the portable electronic device comprises a second portion of the pogo pin connector coupled to a rear of the main display and configured to receive the first portion of the pogo pin connector, wherein the signals are communicated from the portable electronic device to the control board via the pogo pin connector in response to engagement of the first portion with the second portion and the control board is configured to (i) deliver power from the portable electronic device to the display screen and (ii) receive a display signal from the portable electronic device and to transmit the display signal to the display screen.

9. The attachable display device of claim 8, wherein the mount comprises a recess having a magnet embedded therein and the recess is configured for receiving an attachment mechanism on the portable electronic device.

10. The attachable display device of claim 9, wherein the attachment mechanism on the portable electronic device is configured to magnetically couple to the recess.

11. The attachable display device of claim 8, wherein the signals sent from the portable electronic device are high-speed signals.

12. The attachable display device of claim 8, wherein the portable electronic device is a laptop.

13. The attachable display device of claim 8, further comprising a kickstand rotatably attached to the mount.

14. The attachable display device of claim 13, wherein the kickstand is integrally formed with the mount.

* * * * *